United States Patent
Minagata et al.

(10) Patent No.: US 11,302,968 B2
(45) Date of Patent: Apr. 12, 2022

(54) ELECTRIC STORAGE DEVICE AND METHOD OF MANUFACTURING ELECTRODE UNIT

(71) Applicant: KABUSHIKI KAISHA TOYOTA JIDOSHOKKI, Kariya (JP)

(72) Inventors: Atsushi Minagata, Kariya (JP); Yasuyuki Goda, Kariya (JP); Shinya Asai, Kariya (JP); Hiroyasu Nishihara, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 905 days.

(21) Appl. No.: 16/065,378

(22) PCT Filed: Nov. 16, 2016

(86) PCT No.: PCT/JP2016/083954
§ 371 (c)(1),
(2) Date: Jun. 22, 2018

(87) PCT Pub. No.: WO2017/110318
PCT Pub. Date: Jun. 29, 2017

(65) Prior Publication Data
US 2021/0210788 A1  Jul. 8, 2021

(30) Foreign Application Priority Data

Dec. 25, 2015 (JP) ............................... JP2015-254245

(51) Int. Cl.
*H01M 10/0585* (2010.01)
*H01M 4/70* (2006.01)
(Continued)

(52) U.S. Cl.
CPC ......... *H01M 10/0585* (2013.01); *H01M 4/13* (2013.01); *H01M 4/661* (2013.01); *H01M 50/463* (2021.01); *H01M 50/54* (2021.01)

(58) Field of Classification Search
None
See application file for complete search history.

(56) References Cited

U.S. PATENT DOCUMENTS

| 6,641,956 B1 | 11/2003 | Suzuki et al. |
| 2010/0028767 A1 | 2/2010 | Inose et al. |

(Continued)

FOREIGN PATENT DOCUMENTS

| EP | 2 555 304 A1 | 2/2013 |
| JP | 2001-052711 A | 2/2001 |

(Continued)

OTHER PUBLICATIONS

English translation of JP 2005174779 (Year: 2005).*
International Search Report for PCT/JP2016/083954, dated Feb. 14, 2017 (PCT/ISA/210).

*Primary Examiner* — Yoshitoshi Takeuchi
(74) *Attorney, Agent, or Firm* — Sughrue Mion, PLLC

(57) ABSTRACT

A first electrode sheet includes respective active material layers on a first face of a positive electrode metal foil and an opposing second face. The first face active material layer includes a parallel section along the first face, a tapered section between a positive electrode first lateral side of the first face and a first face parallel section and inclined inward towards a current collector inner region relative to a thickness direction of the first face active material layer, and a curved section forming a curved surface between and across the first face parallel and the first face tapered sections. A separator includes a first separator covering the side of the positive electrode metal foil first face, and a second separator covering the side of the second face. A first separator (Continued)

part lying flush against and contacting the first face tapered section arranged along the first face tapered section.

11 Claims, 21 Drawing Sheets

(51) Int. Cl.
*H01M 50/466* (2021.01)
*H01M 50/463* (2021.01)
*H01M 50/538* (2021.01)
*H01M 50/54* (2021.01)
*H01M 4/13* (2010.01)
*H01M 4/66* (2006.01)

(56) References Cited

U.S. PATENT DOCUMENTS

2012/0276437 A1 11/2012 Onishi et al.
2012/0295158 A1* 11/2012 Tanaka .................. H01M 4/13
429/211

FOREIGN PATENT DOCUMENTS

| JP | 2001-176501 | A | 6/2001 | |
|----|----|----|----|----|
| JP | 2005-174779 | A | 6/2005 | |
| JP | 2005174779 | * | 6/2005 | ............ H01M 10/05 |
| JP | 2007-027027 | A | 2/2007 | |
| JP | 2010-034009 | A | 2/2010 | |
| JP | 2011-113843 | A | 6/2011 | |
| JP | 2011-204615 | A | 10/2011 | |
| JP | 2013-069527 | A | 4/2013 | |
| JP | 2013-235673 | A | 11/2013 | |
| JP | 2015-146237 | A | 8/2015 | |

* cited by examiner

ELECTRIC STORAGE DEVICE AND METHOD OF MANUFACTURING ELECTRODE UNIT

CROSS-REFERENCE TO RELATED APPLICATIONS

The present application is a National Phase entry of, and claims priority to, PCT Application No. PCT/JP2016/086954, filed Nov. 16, 2016, which in turn claims priority to Japanese Patent Application No. 2015-254245, filed Dec. 25, 2015, wherein both of these patents are incorporated by reference in their entireties for all purposes.

BACKGROUND

The present invention relates to an electric storage device and a method of manufacturing an electrode unit having electrode sheets enveloped by a separator.

Japanese Laid-Open Patent Publication No. 2007-27027 discloses an electric storage device including an electrode assembly comprising alternately laminated positive electrode units enveloped by a separator, and negative electrode sheets. One example of the positive electrode unit is shown in FIG. 25. A positive electrode unit 900 shown in FIG. 25 includes a positive electrode sheet 910, a first separator 920 and a second separator 930 that cover both sides of the positive electrode sheet 910, respectively. The positive electrode sheet 910 includes active material layers 914 and 916 on both sides of a metal foil 912. The peripheral edge at the upper front region of the first active material layer 914 has a substantially right-angled corner 914a. The first separator 920 is bent at the corner 914a toward the front of the second separator 930 and is overlaid on said second separator 930. The second separator 930 is arranged on a plane along the bottom peripheral edge of the second active material layer 916. Both separators 920 and 930 are welded together in a region to the exterior of the positive electrode sheet 910, at a distance spaced apart from the bottom-front region of the periphery of sheet 910. In FIG. 25, a welded part where both separators 920 and 930 are welded to each other is indicated by a thick solid line. Typically, corner 914a is formed when the positive electrode sheet 910 is prepared by cutting with a blade such as a cutter.

BRIEF SUMMARY

Due to the structural configuration of corner 914a as described above, the first separator 920 may be stretched and torn at the corner 914a of the first active material layer 914. Particularly, when the positive electrode unit 900 is laminated with the negative electrode sheet (not shown), the first separator 920 of the positive electrode unit 900 receives an applied load at its corner 914a due to the lamination. As a result of said applied load, the first separator 920 may possibly tear through at the corner 914a. If the first separator 920 tears, the positive electrode sheet 910 and negative electrode sheet come in contact with each other, resulting in an internal short-circuit, generating abnormal heat.

Accordingly, it is desirable to prevent a separator covering an active material layer from being torn by a peripheral edge of the active material layer.

According to one aspect of the present invention, an electric storage device comprises an electrode body with first electrode units each including separators covering both sides of each of the first electrode sheets, and second electrode sheets having different polarities from the first electrode sheets, where the first electrode units and second electrode sheets are alternately laminated. The first electrode sheets each include a metal foil with a rectangular current collector and also include a tab part provided at one side of the current collector. The metal foil is provided with a first face active material layer on a first face at the current collector and a second face active material layer on a second face opposing the first face. The metal foil is exposed at the tab part. The first face active material layer extending outward from the current collector comprises a first face parallel section parallel to the first face at the current collector, a first face tapered section provided between a tapered side corresponding to one side of the first face at the current collector and the first face parallel section, the first face tapered section being inclined to an inner side of the current collector relative to a thickness direction of the first face active material layer, and a first face curved section continuously extending to form a curved surface between and across the first face parallel section and the first face tapered section. The separator includes a first separator covering the first face side at the current collector and a second separator covering the second face side at the current collector. The first separator and second separator are joined together at least along the tapered side. Further, a part of the first separator opposing to the first face tapered section is arranged along the first face tapered section.

In the above-described configuration, the first face tapered section is formed at the periphery of the first face active material layer, and the first separator is disposed along the first face tapered section. Therefore, unlike a case where a peripheral edge of the front layer of the active material layer is configured as a right-angled corner as shown, for example in FIG. 25, the first separator is prevented from being stretched and torn at the peripheral edge of the first face active material layer. As a result, the first electrode sheet and the second electrode sheet are avoided from contacting with each other (internal short circuit), therefore, the rate of extraction in the discharge test of the electric storage device prior to shipment is reduced and the safety during the use of the electric storage device is enhanced.

According to another aspect of the present invention, the first face tapered section and the first face curved section are melted parts that are formed by melting a surface of the first face active material layer.

In the above-described configuration, since the first face tapered section and the first face curved section are configured as a melted part, these first face tapered section and first face curved section are formed as a smooth surface without burrs. Therefore, the first separator covering the first face is prevented from being torn.

According to another aspect of the present invention, the electric storage device includes a first face edge section continuously provided from the tapered side, wherein the first face edge section is formed in a curved face from the tapered side to the first face tapered section, and inclined to the inner side of a current collector in the thickness direction of the first face active material layer.

In the above-described configuration, since the first face edge section is formed in a curved face, the first face edge section is formed as a smooth surface. Therefore, the first separator covering the first face is prevented from being torn.

According to another aspect of the present invention, the second face active material layer includes a second face parallel section provided along the second face of the current collector, a second face orthogonal section provided continuously from one side corresponding to a tapered side which is one of the sides of the second face of the current collector, so as to be orthogonal to the second face, and a second face curved section continuously extends to form a curved surface between and across the second face parallel section and the second face orthogonal section.

In the above-described configuration, since the peripheral edge of the second face active material layer is formed as the second face orthogonal section, the second face active material layer is formed upright with respect to the second face up to the side of the current collector unlike the case, for example, where the peripheral edge of the second face active material is formed as a tapered section inclined to the inner side of the current collector, as a result, the volume of the active material can be ensured.

According to another aspect of the present invention, the first face tapered section is inclined to the inner side of the current collector at a first face inclination angle in a thickness direction of the first face active material layer. The second face active material layer comprises a second face parallel section provided along the second face of the current collector, a second face tapered section provided from one side corresponding to a tapered side which is one of sides of the second face of the current collector to the second face parallel section, and the second face tapered section being inclined to the inner side of the current collector in the thickness direction of the second face active material layer at a second face inclination angle which is smaller than the first face inclination angle, and a second face curved section continuously extending to form a curved surface between and across the second face parallel section and the second face tapered section. The first separator includes a first separator parallel section disposed along the first face parallel section, a first separator curved section disposed along the first face curved section, a first separator joint section joined with the second separator, a first separator inclined section provided between the first separator curved section and the first separator joint section while being inclined to the second separator side relative to the first separator parallel section. The first separator inclined section includes a first separator first inclined section disposed along the first face tapered section, and a first separator second inclined section extending from the first separator first inclined section so as to be connected to the first separator joint section. The first separator second inclined section is arranged to go away from the second face tapered section as it approaches to the first separator joint section.

In the above-described configuration, the first separator second inclined section is prevented from contacting the second face tapered section by disposing the first separator second inclined section going away from the second face tapered section as it approaches the first separator joint section. Therefore, the first separator second inclined section is prevented from being torn caused by contacting the second face tapered section. Further, the volume of the active material in the first electrode sheet can be ensured by setting the inclination angle of the second face tapered section to be small.

According to another aspect of the present invention, the first face tapered section is provided continuously from the tapered side. The second face active material layer includes a second face parallel section provided along the second face of the current collector, a second face outwardly tapered section provided continuously from one side corresponding to a tapered side which is one of sides of the second face of the current collector, and the second face outwardly tapered section being inclined to an outer side of the current collector in the thickness direction of the second face active material layer, and a second face curved section continuously extending to form a curved surface between and across the second face parallel section and the second face outwardly tapered section. The first face tapered section and the second face outwardly tapered section form cooperatively a continuous face with the metal foil interposed. The first separator includes a first separator parallel section disposed along the first face parallel section, a first separator curved section disposed along the first face curved section, a first separator joint section configured to be joined with the second separator, and a first separator inclined section provided between the first separator curved section and the first separator joint section while being inclined to the second separator side relative to the first separator parallel section. The first separator inclined section includes a first separator first inclined section disposed along the first face tapered section, and a first separator second inclined section extending from the first separator first inclined section so as to be connected to the first separator joint section, and the first separator second inclined section being disposed along the second face outwardly tapered section.

In the above-described configuration, the first face tapered section and the second face outwardly tapered section forms a continuous face while the first separator first inclined section and the first separator second inclined section are disposed along this face. Therefore, the first separator first inclined section and the first separator second inclined section are prevented from being stretched and torn. Further, according to the above-described configuration, the surface from the first face tapered section to the second face outwardly tapered section forms a continuous inclined face extending in an outer side of the positive electrode sheet. Accordingly, when the load is applied to the peripheral edge of the first face parallel section caused by laminating the negative electrode sheet, the load is dispersed from the first face tapered section to the outer side toward the second face outwardly tapered section. As a result, the load applied to the peripheral edge of the first separator parallel section, which is a part of the separator covering the peripheral edge of the first face parallel section, is reduced so that the peripheral edge of the first separator parallel section is restricted or prevented from being torn.

According to another aspect of the present invention, the second separator is arranged along the second face parallel section to an outer side of the first electrode sheet.

In the above-described configuration, since the second separator is arranged along the second face parallel section to the outer side of the first electrode sheet, the second separator will not bend at the peripheral edge of the second face active material layer so that the second separator is prevented from being stretched and torn.

According to another aspect of the present invention, the second separator includes a second separator parallel section disposed along the second face parallel section, a second separator curved section disposed along the second face curved section, a second separator joint section configured to be joined with the first separator, and a second separator inclined section provided between the second separator curved section and the second separator joint section so as to be inclined to the first separator side with respect to the second separator parallel section.

In the above-described configuration, the second separator can be disposed more closely to the first separator side since the second separator includes the second separator inclined section. In this way, a portion of the first separator, which is allowed to approach close to the second separator side to join both the separators, can be shortened so that the load burden on the first separator can be reduced. Therefore, the first separator may be prevented from being torn.

According to another aspect of the present invention, a plurality of the first electrode units and a plurality of the second electrode sheets are alternately laminated in the electric storage device, and each first face of each of the first electrode units may be oriented in the same direction.

In the above-described configuration, each of the first electrode units is laminated with each of the first face oriented in the same direction. Therefore, efficient and simplified manufacturing of the laminated body is facilitated because each first electrode unit needs only to be laminated alternately with the negative electrode sheets with constantly the same orientation without needing to reverse the front and back sides when manufacturing the laminated body.

According to one aspect of the present invention, in an electrode unit manufacturing method, an electrode unit is manufactured, wherein an electrode sheet includes a first face active material layer provided on a first face of a metal foil that has a rectangular current collector and a tab part provided at one side of the current collector, and a second face active material layer provided on a second face opposing to the first face, wherein the metal foil is exposed at the tab part. The first face of the current collector is covered by a first separator with a larger area than the current collector while the second face of the current collector is covered by a second separator with a larger area than the current collector. The method for manufacturing the electrode unit comprising: a step for preparing a base sheet including a strip-shaped metal foil with the first face active material layer on its first face and the second face active material layer on its second face, wherein the first face active material layer includes a first face parallel section along the first face on a surface of the first face active material layer, and the second face active material layer includes a second face parallel section along the second face on a surface of the second face active material layer; a step for cutting out the electrode sheet, wherein the electrode sheet is cut out of the base sheet by irradiating laser to the base sheet from the first face active material layer side to the second face active material layer side, while a first face tapered section is formed at the first face active material layer between a tapered side corresponding to one side of the first face of the current collector and the first face parallel section and inclined to an inner side of the current collector in a thickness direction of the first face active material layer; a step for placing the electrode sheet from the second face active material layer side onto the second separator such that the current collector is placed within an area of the second separator; a step for laminating the separators, wherein the first separator is laminated from the first face active material layer onto the electrode sheet as well as the second separator in a location where the current collector is placed within an area of the first separator; and a joining step for joining the first separator and the second separator to each other.

In the above-described configuration, the electrode unit may be manufactured that includes the first face tapered section at the peripheral edge of the first face active material layer. With this electrode unit, the first separator is prevented from being stretched and torn at the peripheral edge of the first face active material layer unlike the case where, for example, the peripheral edge at the front layer of the active material layer has a substantially perpendicular corner as shown in FIG. 25. Further, since the first face tapered section is melted by the laser beam, this first face tapered section is formed as a smooth surface without burr. Therefore, the first separator covering the first surface is prevented from being torn.

According to another aspect of the present invention, in the joining step, the first separator and the second separator are joined to each other at least along the tapered side.

In the above-described configuration, a part of the first separator opposing to the first face tapered section can be disposed along the first face tapered section by joining the first separator and the second separator to each other at least along the tapered section.

According to another aspect of the present invention, the first separator and the second separator are joined to each other while applying a tension to the first separator so that a part of the first separator opposing to the first face tapered section is arranged along the first face tapered section in the joining step.

In the above-configuration, the part of the first separator opposing to the first face tapered section may reliably be arranged along the first face tapered section.

DETAILED DESCRIPTION

Figure 1:
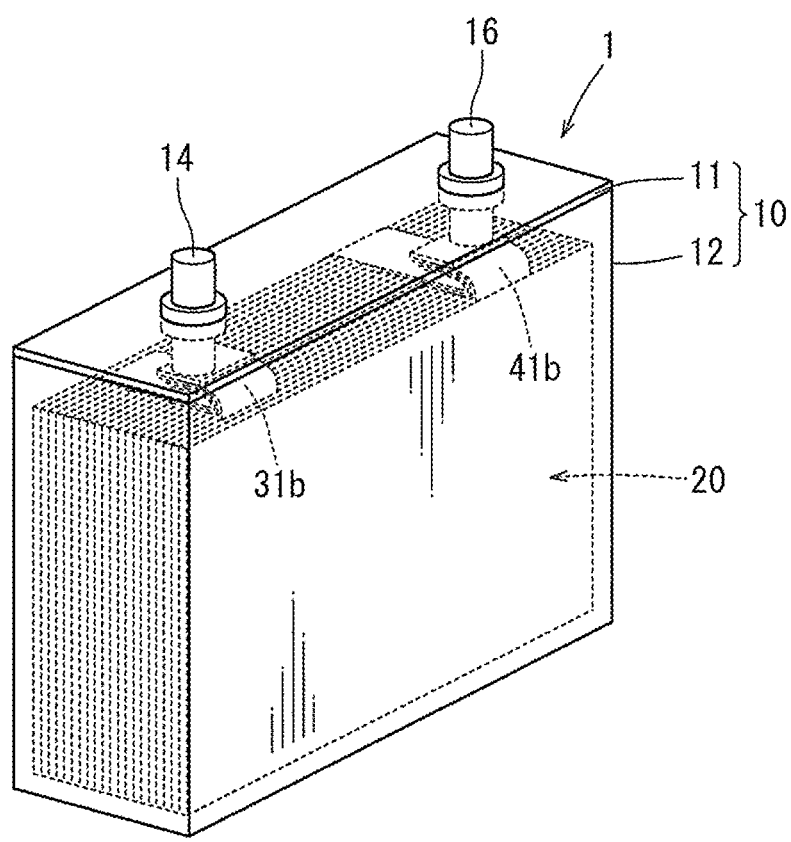
FIG. 1 is a perspective view of an electric storage device.

Hereinafter, exemplary embodiments for carrying out the present invention will be described with reference to the drawings. An electric storage device shown in FIG. 1 is, for example, a lithium ion secondary battery. A case 10 for the electric storage device 1 may include a rectangular parallelopiped case main body 12 with a bottom, and a plate-like cover 11 for covering an opening of the case main body 12. The cover 11 may have external connection terminals 14 and 16. The external connection terminals 14 and 16 penetrate through the cover 11 in the thickness direction, forming two circular planes in the intersection of said terminals with the plane of the plate-like cover 11.

As shown in FIG. 1, the electric storage device 1 may include an electrode assembly 20 (electrode body) and electrolyte solution (not shown), both of which are in the interior of the case 10. The electrode assembly 20 is connected to the external connection terminals 14 and 16 via a positive electrode tab 31b and a negative electrode tab 41b, which will be described infra. The electrode assembly 20 serves to supply electric power to the outside of the electric storage device 1 through the external connection terminals 14 and 16 (discharge). Conversely, electric power may also be supplied from the outside of the electric storage device to the interior (recharge) through the external connection terminals 14 and 16.

Figure 2:
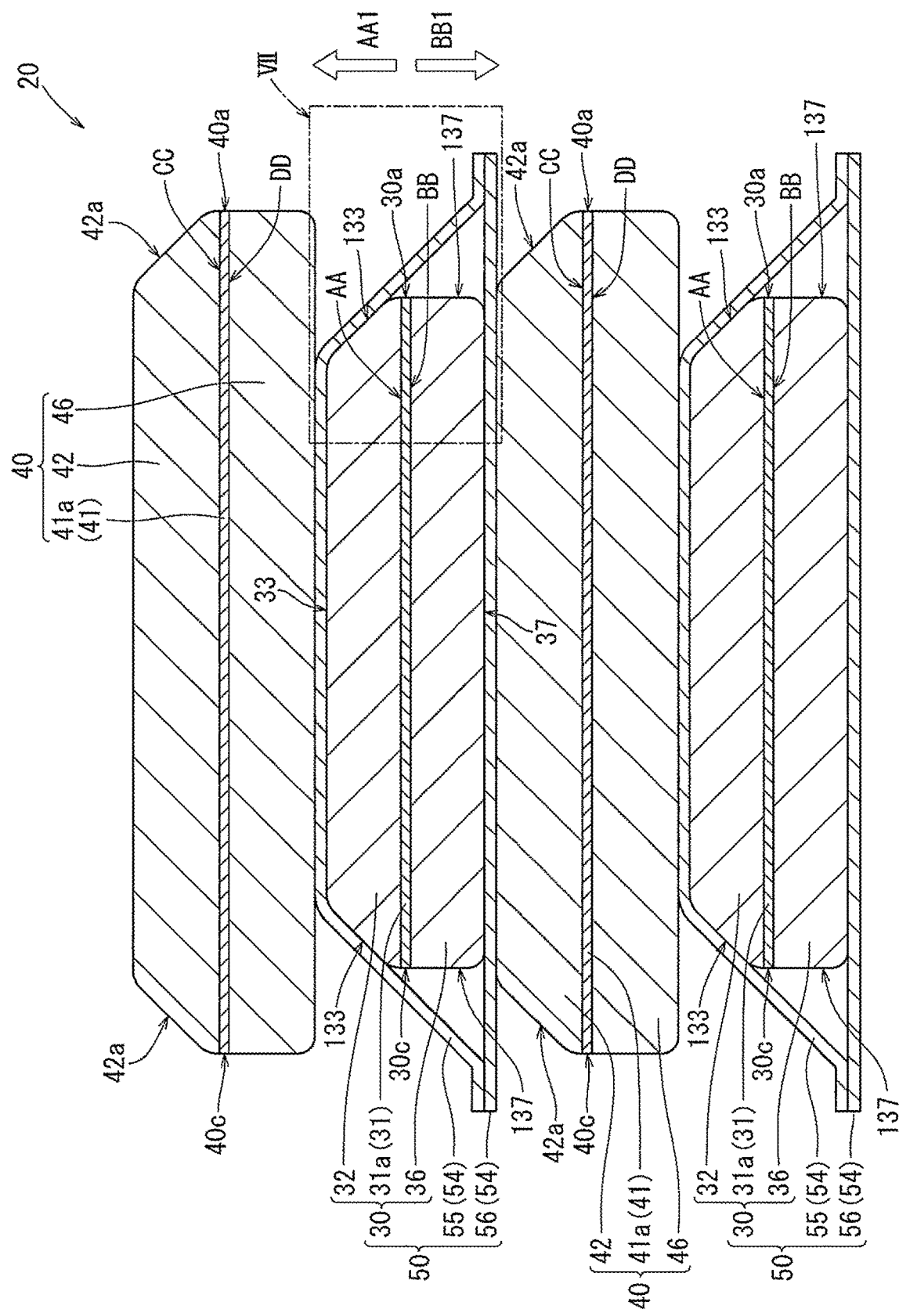
FIG. 2 is a cross-sectional view of an electrode assembly.
Figure 3:
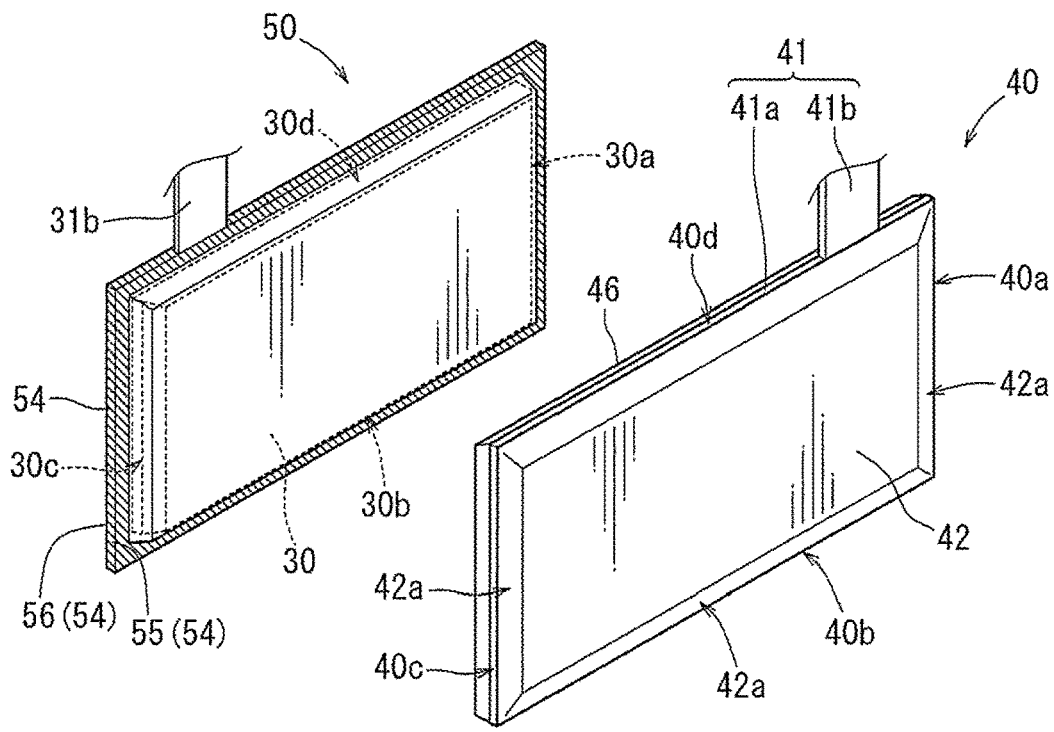
FIG. 3 is a perspective view of a positive electrode unit and a negative electrode sheet.
Figure 4:
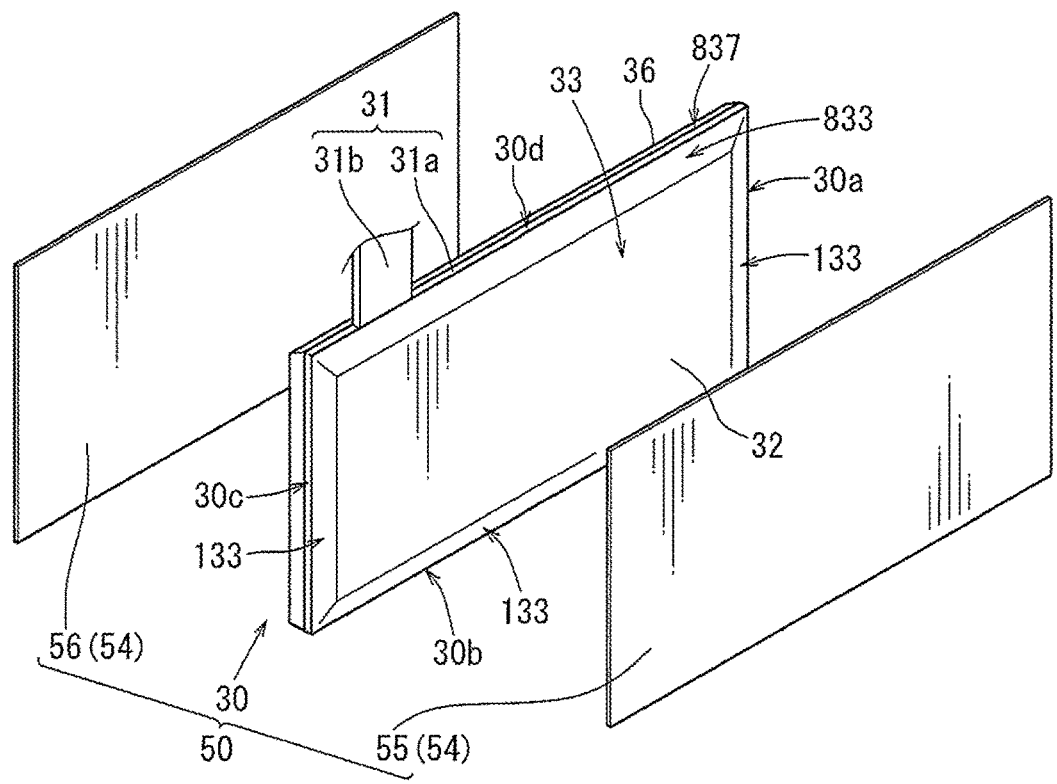
FIG. 4 is a perspective view of a positive electrode sheet and a separator.

As shown in FIGS. 2 and 3, positive electrode units 50 (first electrode units) and negative electrode sheets 40 (second electrode sheets) are alternately laminated in the electrode assembly 20. As shown in FIGS. 2, 3 and 4, positive electrode unit 50 may include a positive electrode sheet 30 (first electrode sheet), and separators 54 that cover both sides of the positive electrode sheet 30. As shown in FIG. 2, the positive electrode units 50 may be laminated with each of their first faces AA, which will be described infra, oriented in the same direction.

Figure 5:
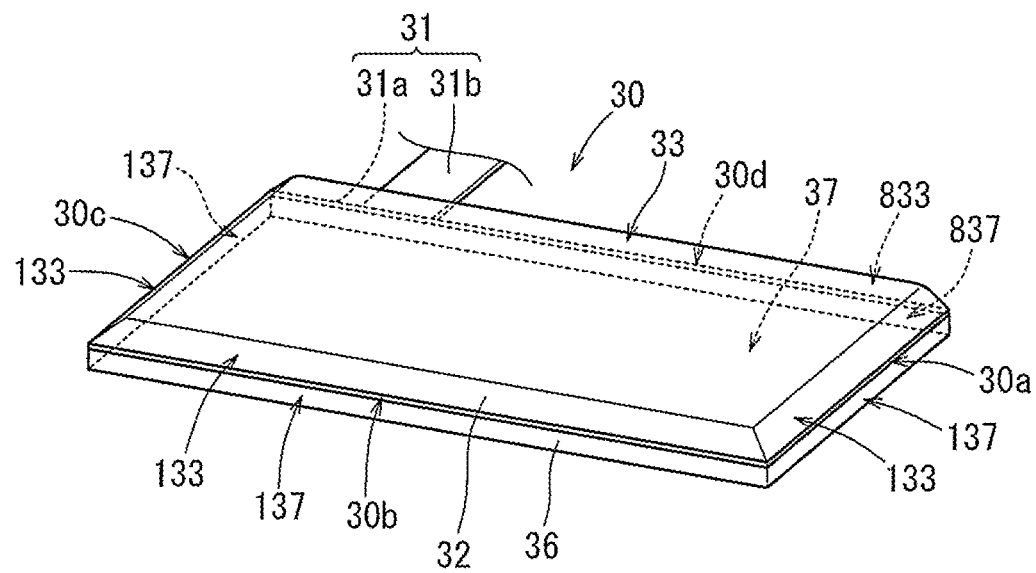
FIG. 5 is a perspective view of the positive electrode sheet.

As shown in FIGS. 2, 4 and 5, the positive electrode sheet 30 may have a positive electrode metal foil (metal foil) 31 as a base body. The positive electrode metal foil 31 may be, for example, an aluminum foil. Hereinafter, both rectangular faces of the positive electrode metal foil 31, perpendicular to the thickness direction of said foil, are referred to as first face AA and second face BB, respectively. The positive electrode metal foil 31 may include a rectangular positive electrode current collector (current collecting portion) 31a and a positive electrode tab (tab portion) 31b formed to extend from a positive electrode tab side 30d that is the upper side of the positive electrode current collector 31a. The positive electrode current collector 31a is provided with a first face positive electrode active material layer (first face active material layer) 32 extending outward from its first face AA and a second face positive electrode active material layer (second face active material layer) 36 extending outward from its second face BB. Both positive electrode active material layers 32 and 36 are provided, on substantially the entire surface area of the rectangular faces of positive electrode current collector 31a perpendicular to the thickness direction of collector 31a. Both positive electrode active material layers 32 and 36 may include, for example, a lithium-containing metal oxide. The first face positive electrode active material layer 32 extends in the thickness direction, perpendicular to the rectangular face AA of 31a, from the first face AA to a first face parallel section 33, wherein the direction of extension is denoted with a reference sign AA1 in FIGS. 2, 7 and 8, as will be described infra. The second face positive electrode active material layer 36 extends in the thickness direction, perpendicular to the rectangular face BB of 31a, from the second face BB to a second face parallel section 37, wherein the direction of extension is denoted with a reference sign BB1 in FIGS. 2, 7 and 8, as will be described infra.

As shown in FIGS. 4 and 5, the first face positive electrode active material layer 32 and the second face positive electrode active material layer 36 extend outward in the thickness direction from rectangular faces AA and BB respectively, and thus are not provided on the upper side of the positive electrode metal foil 31, where positive electrode tab 31b is located, such that at its upper side the positive electrode metal foil 31 is exposed, as seen in FIG. 4. When collectively laminated, as shown in FIG. 2, the positive electrode tabs 31b of positive electrode sheets 30 may be overlap with each other and, these overlapping sheets may be gathered collectively, and welded to one of the external connection terminals 14 (see FIG. 1). The bottom side of the positive electrode current collector 31a vertically opposite the positive electrode tab side 30d is referred to as the positive electrode tab opposing side 30b. The two edges of current collector 31a orthogonal to the positive electrode tab side 30d and the positive electrode tab opposing side 30b are respectively referred to as positive electrode first lateral side 30a and positive electrode second lateral side 30c, as shown in FIG. 4. Each of the sides 30a, 30b, 30c and 30d of the positive electrode current collector 31a also defines each respective side of the positive electrode sheet 30.

As shown in FIG. 5, the first face positive electrode active material layer 32 includes a first face parallel section 33, first face melted parts 133 and a first face coated edge 833. The first face melted parts 133 may be provided along the positive electrode first lateral side 30a, the positive electrode tab opposing side 30b and the positive electrode second lateral side 30c, extending from the lateral peripheral outer edge of current collector 31a at these three sides respectively, inwards, to the first face parallel section 33, which is parallel to face AA. Each first face melted part 133 is a melted part formed by melting the surface of the first face positive electrode active material layer 32, for example, with a laser beam. The configuration of each first face melted part 133 is identical. The first face coated edge 833 may be provided along the positive electrode tab side 30d, extending from the upper peripheral edge of current collector 31a to the upper edge of first face parallel section 33. The first face coated edge 833 is an edge of the active material layer formed by coating of the active material for the positive electrode on the first face AA. The first face parallel section 33, each first face melted part 133, and the first face coated edge 833 collectively constitute the outer peripheral surface of the first face positive electrode active material layer 32.

Figure 7:
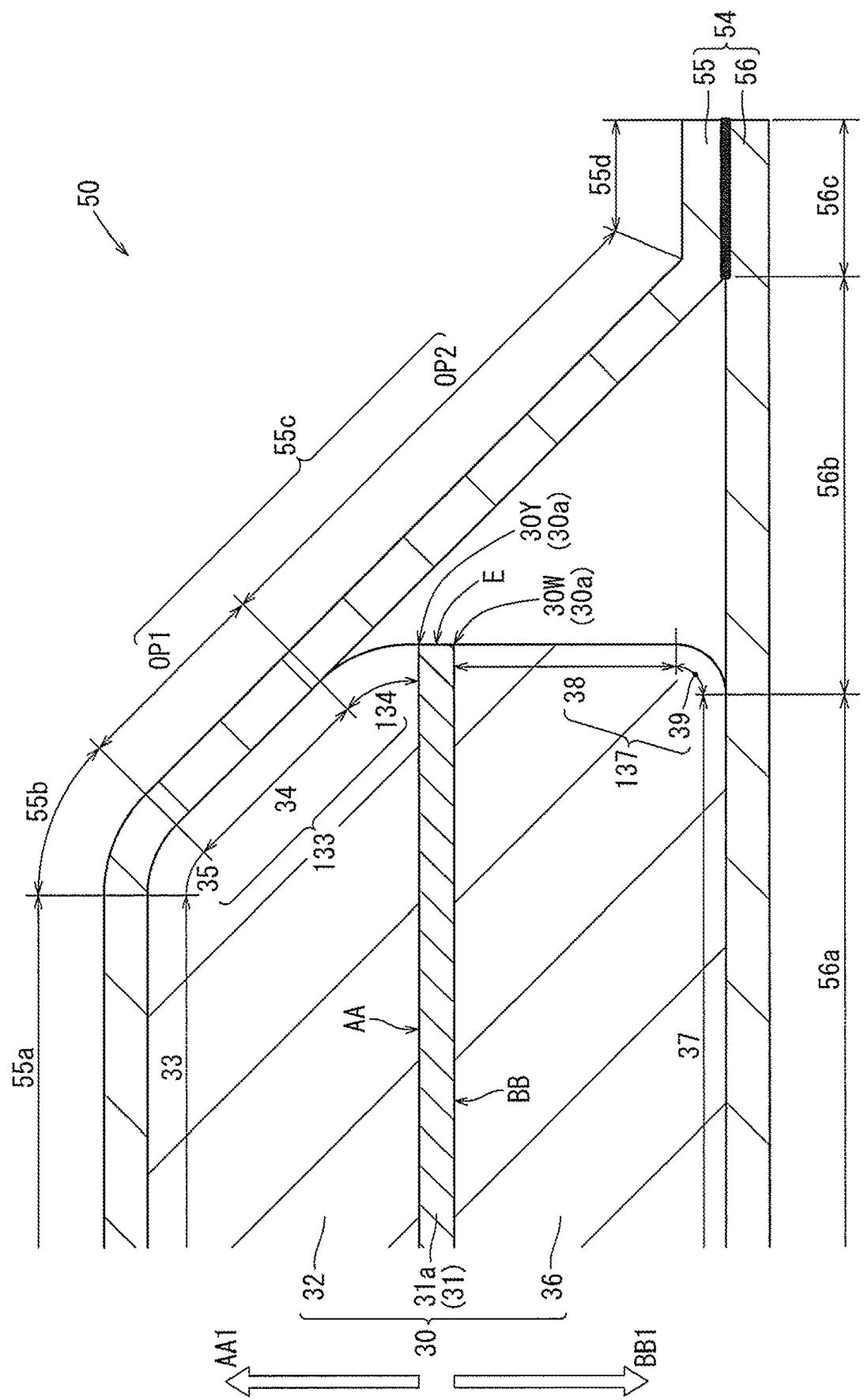
FIG. 7 is an enlarged cross-sectional view of an area VII in FIG. 2.

As shown in FIG. 7, the first face parallel section 33 is provided parallel to the first face AA for most of the longitudinal length of AA, apart from the end portions of the first face AA. The first face melted parts 133 may have a first face curved section 35, a first face tapered section 34 and a first face edge section 134, where these components extend in this order from the first face parallel section 33 to the first face AA. The first face curved section 35 continuously extends in a curved surface manner to extend between a peripheral edge of the first face parallel section 33 and the first face tapered section 34, which will be described next. The first face tapered section 34 may be provided between first face edge section 134 and curved section 35, in a planar shape, which relative to a thickness direction AA1 of the first face positive electrode active material layer 32, is linearly inclined inward toward the inner region of the positive electrode current collector 31*a*. The first face positive electrode side 30Y is the edge at the intersection of positive electrode first lateral side 30*a* and the first face AA to which the first lateral side 30*a* is orthogonal to. The first face edge section 134 may share a contiguous border with first face positive electrode side 30Y, and may extend in a smooth curved manner, inclined inwards from the first face positive electrode side 30Y toward the first face tapered section 34. The inwards inclination is toward the inner region of the positive electrode current collector 31*a*, toward first face parallel section 33, relative to the thickness direction shown by arrow AA1 showing the direction of extension in the thickness direction of first face positive electrode active material layer 32.

Figure 8:
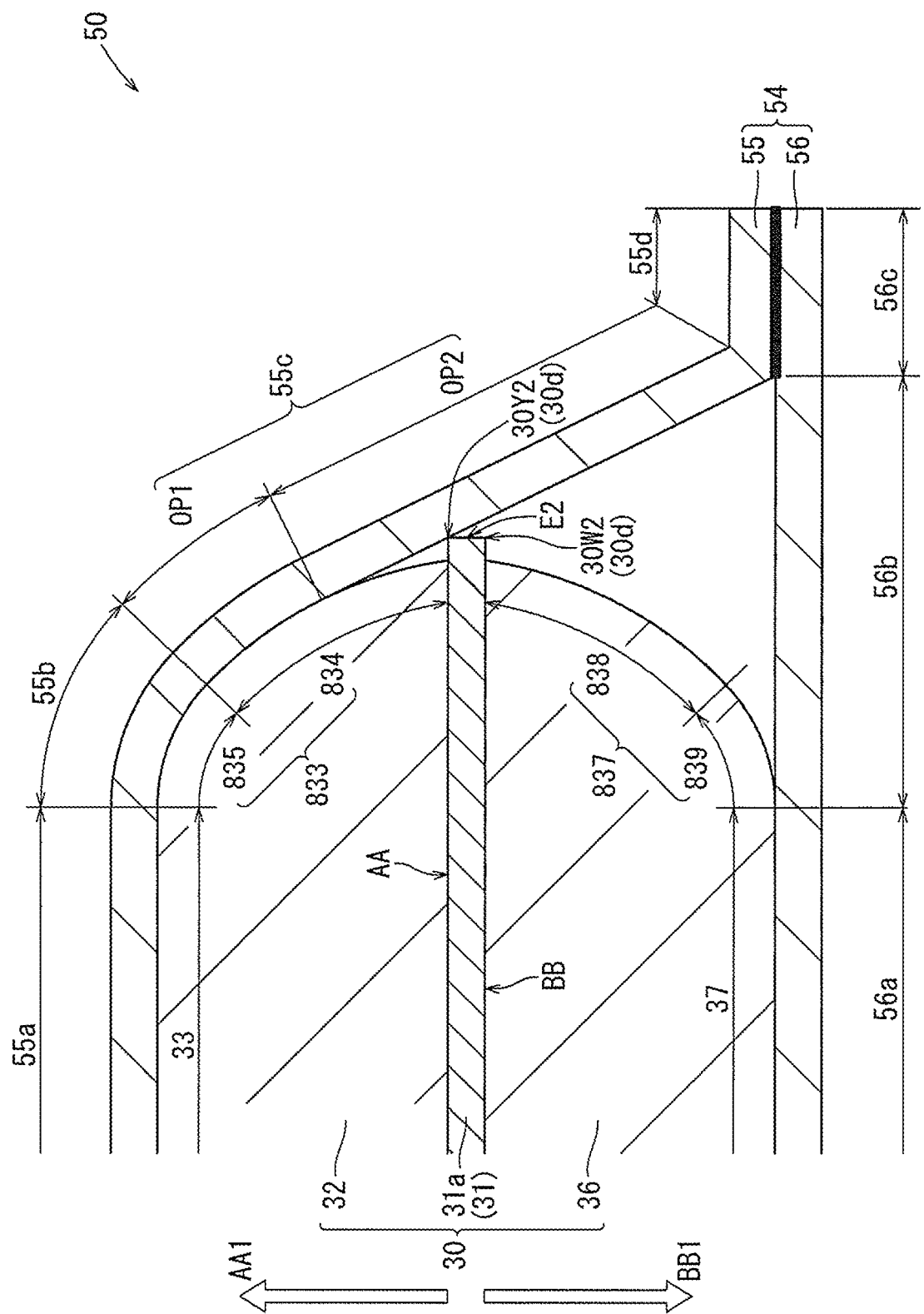
FIG. 8 is an enlarged cross-sectional view of the positive electrode unit near a positive electrode tab side.

As shown in FIG. 8, the first face coated edge 833 includes a first face coated curved section 835 and a first face coated tapered section 834. The first face coated curved section 835 continuously extends in a curved surface manner between the peripheral edge of the first face parallel section 33 and the first face coated tapered section 834, as will be described infra. The first face coated tapered section 834 may be provided between a first face tab positive electrode side 30Y2 and the first face coated curved section 835. More specifically, the first face coated tapered section 834 may extend from the vicinity of the first face tab positive electrode side 30Y2 inwards towards the first face coated curved section 835, in a curved manner. The first face tab positive electrode side 30Y2 is the edge formed by the intersection of positive electrode tab side 30*d* and the first face AA. The first face coated tapered section 834 is formed to have a curved surface, which is gently curved inwards from the vicinity of the first face tab positive electrode side 30Y2 of the positive electrode current collector 31*a*, towards first face parallel section 33, relative to the thickness direction shown by arrow AA1, showing the direction of extension in the thickness direction of the first face positive electrode active material layer 32. Further, the first face coated tapered section 834 may have a planar shape, which is curvedly inclined toward the inner side of the positive electrode current collector 31*a*. The first face coated curved section 835 is involved in the "first face curved section" in the present invention. The first face coated tapered section 834 is involved in the "first face tapered section" in the present invention.

"A tapered side" according to the present invention is a side provided, such as the side provided above with the first face tapered section 34 or the side provided with the first face coated tapered section 834 of the first face AA. According to the present embodiment, all four sides 30*a*, 30*b*, 30*c* and 30*d* of the positive electrode current collector 31*a* correspond to a similarly inwardly tapered sides as the linearly inclined first face tapered section 34, described for side 30*a*, where sides 30*b* and 30*c* have a similar structure pointing inwards toward first face parallel section 33, and where the first face coated tapered section 834 of side 30*d* is as described above, as shown in FIGS. 4 and 5.

As shown in FIG. 5, the second face positive electrode active material layer 36 includes a second face parallel section 37 on the opposite vertical end of first face parallel section 33, second face melted parts 137 and a second face coated edge 837. The second face melted parts 137 may be provided respectively along the positive electrode first lateral side 30*a*, the positive electrode tab opposing side 30*b* and the positive electrode second lateral side 30*c*. The second face melted parts 137 may be comprised of melted parts formed by melting the surface of the second face positive electrode active material layer 36, for example, with a laser beam. The configuration of each second face melted part 137 is identical. The second face coated edge 837 may be provided along the positive electrode tab side 30*d*. The second face coated edge 837 is the edge of the active material layer formed when the active material for the positive electrode is coated on the second face BB. The second face parallel section 37, the second face melted parts 137 and the second face coated edge 837 respectively collectively constitute the outer peripheral surface of the second face positive electrode active material layer 36.

As shown in FIG. 7, the second face parallel section 37 is provided parallel to the second face BB for most of the longitudinal length of BB, apart from the outer end portions the second face BB. The second face melted parts 137 may include a second face curved section 39 and a second face orthogonal section 38. The second face curved section 39 may extend continuously in a curved manner from the longitudinal outer end of the second face parallel section 37 parallel to face BB, to the second face orthogonal section 38, as will be described infra. The second face orthogonal section 38 is provided to extend continuously from the second face curved section 39 to face BB, in a vertical direction orthogonal to the positive electrode first face BB, and extends up to the second face positive electrode side 30W. The second face positive electrode side 30W is the edge formed by the intersection of the positive electrode first lateral side 30*a* and the second face BB.

As shown in FIG. 8, the second face coated edge 837 includes a second face coated curved section 839 and a second face coated tapered section 838. The second face coated curved section 839 extends continuously in a curved manner to extend from the outer peripheral edge of second face parallel section 37 corresponding to side 30*d* between the second face parallel section 37 and the second face coated tapered section 838. The second face coated tapered section 838 may be provided between the second face coated curved section 839 and the second face tab positive electrode side 30W2, . . . . The second face tab positive electrode side 30W2 is the edge formed by the intersection of the positive electrode tab side 30*d* and the second face BB. The second face coated tapered section 838 is formed to have a curved surface, which is gently curved from the vicinity of the second face tab positive electrode side 30W2 to the inner region of the positive electrode current collector 31*a* towards second face parallel section 37, relative to the thickness direction shown by arrow BB1, showing the direction of extension in the thickness direction of the second face positive electrode active material layer 36. Further, the second face coated tapered section 838 may have a planar shape, which is curvedly inclined toward the inner side of the positive electrode current collector 31*a*.

As shown in FIG. 2, the separators 54 include a first separator 55 that covers the outer surface of the first face positive electrode active material layer 32 extending outward from the first face AA of the positive electrode current collector 31*a* and a second separator 56 that covers the outer surface of the second face positive electrode active material layer 36 extending outward from the second face BB of the positive electrode current collector 31*a*. As shown in FIG. 4, both separators 55 and 56 may comprise a larger surface area than the positive electrode current collector 31*a*. Both separators 55 and 56 may be welded (joined) together along each side 30*a*, 30*b*, 30*c* and 30*d* of the positive electrode current collector 31*a* as shown in FIG. 3. The positive electrode tab 31*b* may be exposed as described above, extending outward from the positive electrode metal foil 31*a*, positioned between both separators 55 and 56 as shown in FIG. 3. In FIG. 3, the welded area of both separators 55 and 56 are indicated by hatching.

As shown in FIG. 7, both separators 55 and 56 are welded such that a part of the first separator 55 is flush against and oppositely faces the first face tapered section 34. In FIG. 7, the part where both separators 55 and 56 are welded together is indicated with a thick solid line. Although FIG. 7 shows that both separators 55 and 56 are welded close to the positive electrode first lateral side 30*a*, both separators 55 and 56 are also welded together at the positive electrode tab opposing side 30*b* (see FIG. 5) and positive electrode second lateral side 30*c* similar to the positive electrode first lateral side 30*a*. The way how both separators 55 and 56 are welded at the positive electrode tab side 30*d* will be described infra with reference to FIG. 8.

As shown in FIG. 7, the first separator 55 includes a first separator parallel section 55*a*, a first separator curved section 55*b*, a first separator inclined section 55*c* and a first separator joint section 55*d*. The first separator parallel section 55*a* may be planarly arranged, parallel to face AA and separator 56, along the first face parallel section 33, and may lie flush against contact the first face parallel section 33. The first separator curved section 55*b* may be arranged so as to curve in a flush manner along the first face curved section 35 and may contact the first face curved section 35. A first separator inclined section 55*c* may be provided between the first separator curved section 55*b* and the first separator joint section 55*d*, and may be linearly inclined, for example, toward the second separator 56 side relative to the first separator parallel section 55*a*. The first separator inclined section 55*c* may include a first separator first inclined section OP1 opposed to the first face tapered section 34, and a first separator second inclined section OP2, which is provided to extend linearly at the same inclination as OP1, from the first separator first inclined section OP1 to the first separator joint section 55*d*. The first separator first inclined section OP1 may be arranged flush against the first face tapered section 34, and may contact the first face tapered section 34. The first separator second inclined section OP2 may be arranged at the same inclination as OP1, linearly inclined and spaced apart at a linearly increasing horizontal distance according to the slope of OP2 from a first face edge section 134, an end face E corresponding to a thickness of the positive electrode metal foil 31, a second face orthogonal section 38 and a second face curved section 39, with the order of elements being from shortest to farthest spaced apart from OP2. In this manner, the first separator second inclined section OP2 is spaced apart in an increasing manner from the first face edge section 134, the end face E, the second face orthogonal section 38 and the second face curved section 39 as it approaches to the first separator joint section 55*d*. The first separator joint section 55*d* may be positioned on the surface of the second separator 56 and may be welded with a second separator 56*c*, which will be described infra.

The second separator 56 is arranged as a flat surface flush against and contacting the second face parallel section 37, extending up to and beyond the outer peripheral edge side of the positive electrode sheet 30. The second separator 56 may include a second separator parallel section 56*a*, a second separator outer section 56*b* and a second separator joint section 56*c*. The second separator parallel section 56*a* may be arranged as a flat shape flush against and contacting the second face parallel section 37. The second separator outer section 56*b* may be positioned outward relative to the positive electrode sheet 30, extending in the same plane as 56*a*, such that it does not contact either the positive electrode sheet 30 or the first separator 55. The second separator joint section 56*c* may be welded with the first separator joint section 55*d*.

As shown in FIG. 8, proximate to side 30*d*, both separators 55 and 56 are welded such that a part of the first separator 55 opposed to the first face coated tapered section 834 can be arranged along the first face coated tapered section 834. In this manner, the first separator 55 extends flush against and contacts the first face coated tapered section 834 only partially. The parts of both separators 55 and 56 having the same or substantially equivalent configurations and/or functionality as those parts in FIG. 7 are denoted with the same reference numerals as in FIG. 7 to omit redundant description. The first separator curved section 55*b* is arranged so as to curve flush against the first face coated curved section 835 such that it contacts the first face coated curved section 835. The first separator first inclined section OP1 is arranged flush against and contacting the first face coated tapered section 834 for part of 834, excluding an end part of the first face coated tapered section 834 proximate to the first face tab positive electrode side 30Y2, and contacts said first face coated tapered section 834. The first separator second inclined section OP2 extends outward at the same linear inclination as the first separator first inclined OP1, and is arranged in a position increasingly linearly spaced apart from an end part of the first face coated tapered section 834 proximate to the first face tab positive electrode side 30Y2, and the end face E2 of the positive electrode metal foil 31, the second face coated tapered section 838, and the second face coated curved section 839, and disposed in a position increasingly distant from each of these parts.

Figure 6:
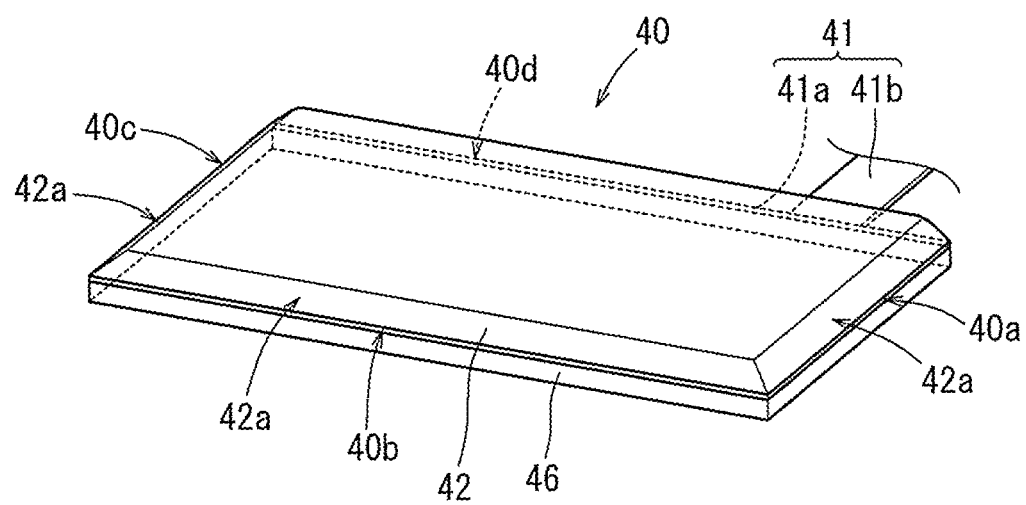
FIG. 6 is a perspective view of the negative electrode sheet.

As shown in FIGS. 2, 3 and 6, the negative electrode sheet 40 includes a negative electrode metal foil 41 as a base body. The negative electrode metal foil 41 is, for example, a copper foil. Hereinafter, both rectangular faces of the negative electrode metal foil 41, perpendicular to the thickness direction of said foil, are referred to as negative electrode first face CC and negative electrode second face DD. The negative electrode metal foil 41 may include a rectangular negative electrode current collector 41*a*, and a negative electrode tab 41*b* extending from a negative electrode tab side 40*d*, which is the upper side of the negative electrode current collector 41*a* (as seen, e.g. in FIGS. 1 and 6). The negative electrode current collector 41*a* may be provided with a first face negative electrode active material layer 42 extending outward from its negative electrode first face CC and a second face negative electrode active material layer 46 extending outward from its negative electrode second face DD. Both negative electrode active material layers 42 and 46 may be provided, for example, on substantially the entire surface area of the rectangular faces of negative electrode current collector 41*a* perpendicular to the thickness direction of collector 41*a*. Both negative electrode active material layers 42 and 46 may contain, for example, carbon.

As shown in FIGS. 3 and 6, the first face negative electrode active material layer 42 and the second face negative electrode active material layer 46 are not provided on the negative electrode tab 41*b* such that the negative electrode metal foil 41 is exposed, as seen in FIG. 6. The negative electrode tabs 41 of the negative electrode sheets 40 may overlap with each other and, these overlapping sheets may be gathered collectively, and welded to one of the external connection terminals 16 (see FIG. 1). The bottom side of the negative electrode current collector 41a (as seen e.g. in FIGS. 1 and 6), vertically opposed to the negative electrode tab side 40d, is referred to as a negative electrode tab opposing side 40b. The two edges of current collector 31a orthogonal to the negative electrode tab side 40d and the negative electrode tab opposing side 40b are respectively referred to as a negative electrode first lateral side 40a and a negative electrode second lateral side 40c. Each of the sides 40a, 40b, 40c and 40d of the negative electrode current collector 41a also defines each respective side of the negative electrode sheet 40.

As shown in FIGS. 2, 3 and 6, the first face negative electrode active material layer 42 includes negative electrode tapered sections 42a. The negative electrode tapered sections 42a may be provided along each of the negative electrode first lateral side 40a, negative electrode tab opposing side 40b and negative electrode second lateral side 40c, respectively. Each negative electrode tapered section 42a may be, for example, linearly inclined from each corresponding sides 40a, 40b and 40c toward the inner region of the negative electrode current collector 41a. Description of each of the negative electrode tapered sections 42a is similar to that of the melted parts 133 with a first face curved section, a first face tapered section, and a first face edge section, as seen in FIG. 2, and is therefore omitted.

Figure 25:
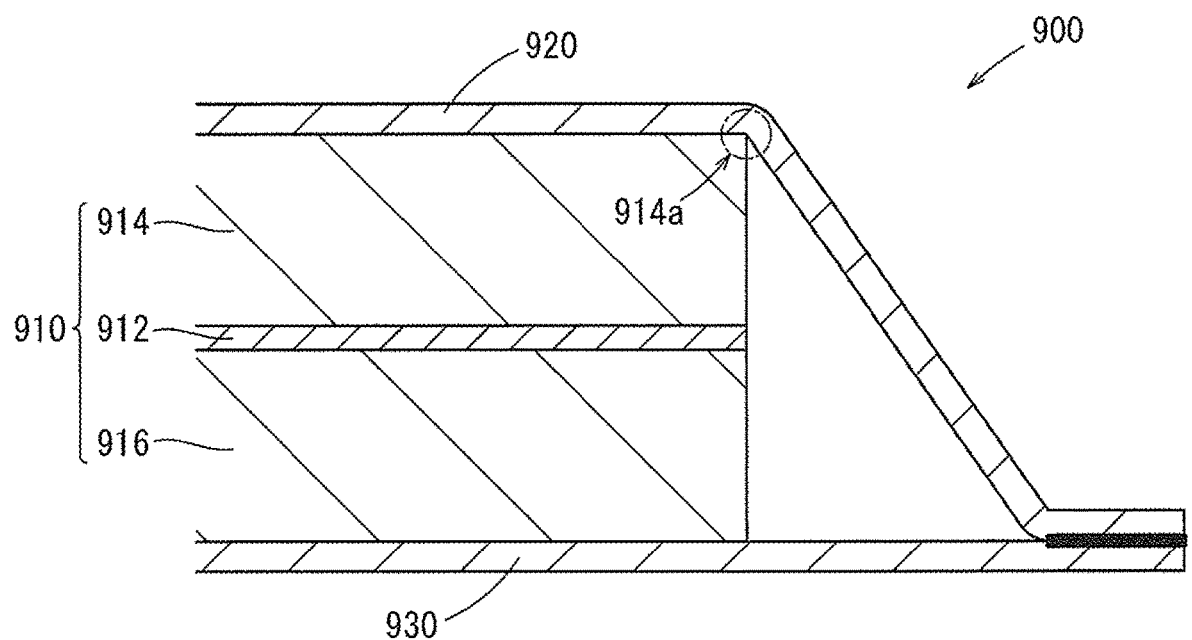
FIG. 25 is a cross-sectional view of a conventional positive electrode unit.

The negative electrode assembly 20 is constructed as described above. Unlike the case, for example, of the positive electrode sheet 910 shown in FIG. 25 where the peripheral edge of the surface of the active material layer has right-angled corners 914a, the first face curved section 35 and the first face tapered section 34 in the above-described configuration are formed at the peripheral edge of the first face positive electrode active material layer 32 (see FIG. 7) and the first separator curved section 55b and the first separator first inclined section OP1 are arranged flush against and contact the first face curved section 35 as well as the first face tapered section 34. This configuration prevents the first separator 55 from being stretched and torn at the peripheral edge of the first face positive electrode active material layer 32. As a result, the positive electrode sheet 30 and the negative electrode sheet 40 in the electrode assembly 20 (see FIG. 2) are prevented from contacting each other (where such a contact would cause an internal short circuit), and therefore, the rate of extraction in the discharge test of the electric storage device prior to shipment, as well as safety during use of the electric storage device, is improved.

In the above-described configuration, since the first face curved section 35, first face tapered section 34 and first face edge section 134 (see FIG. 7) define a melted part, by the nature of being a melted part the first face curved section 35, first face tapered section 34 and first face edge section 134 are all formed of a smooth surface without burrs. Therefore, the first separator curved section 55b covering the first face curved section 35 as well as the first separator first inclined section OP1 covering the first face tapered section 34 are prevented from being torn. Further, even when the first separator second inclined section OP2 contacts the first face edge section 134, the first separator second inclined section OP2 is prevented from being torn.

In the above-described configuration, since the first face curved section 35 and first face edge section 134 are each formed as curved surfaces, these surfaces are formed to be smooth. Therefore, the first separator curved section 55b covering the first surface curved section 35 is prevented from being torn. Further, the first separator second inclined section OP2 is prevented from being torn, even when the first separator second inclined section OP2 contacts the first face edge section 134.

In the above-described configuration, since the peripheral edge of the second face positive electrode active material layer 36 is a second face orthogonal section 38 (see FIG. 7), the second face positive electrode active material layer 36 is formed upright relative to the second face BB, up to the peripheral end of the positive electrode current collector 31a. This is unlike the case where, for example, the peripheral edge of the second face positive electrode active material layer 36 is formed as a tapered section inclined to the inner side of the positive electrode current collector 31a. As a result, the volume of the active material can be ensured.

In the above-described configuration, the positive electrode units 50 are laminated with their first face AA oriented such that they are facing in the same direction (see FIG. 2) when stacked. Therefore, this simplifies facilitation of manufacturing of the electrode assembly 20 because each positive electrode unit 50 needs only to be laminated alternately with the negative electrode sheets 40 with constantly the same orientation without a need for reversing the front and back sides when manufacturing the electrode assembly 20.

Figure 9:
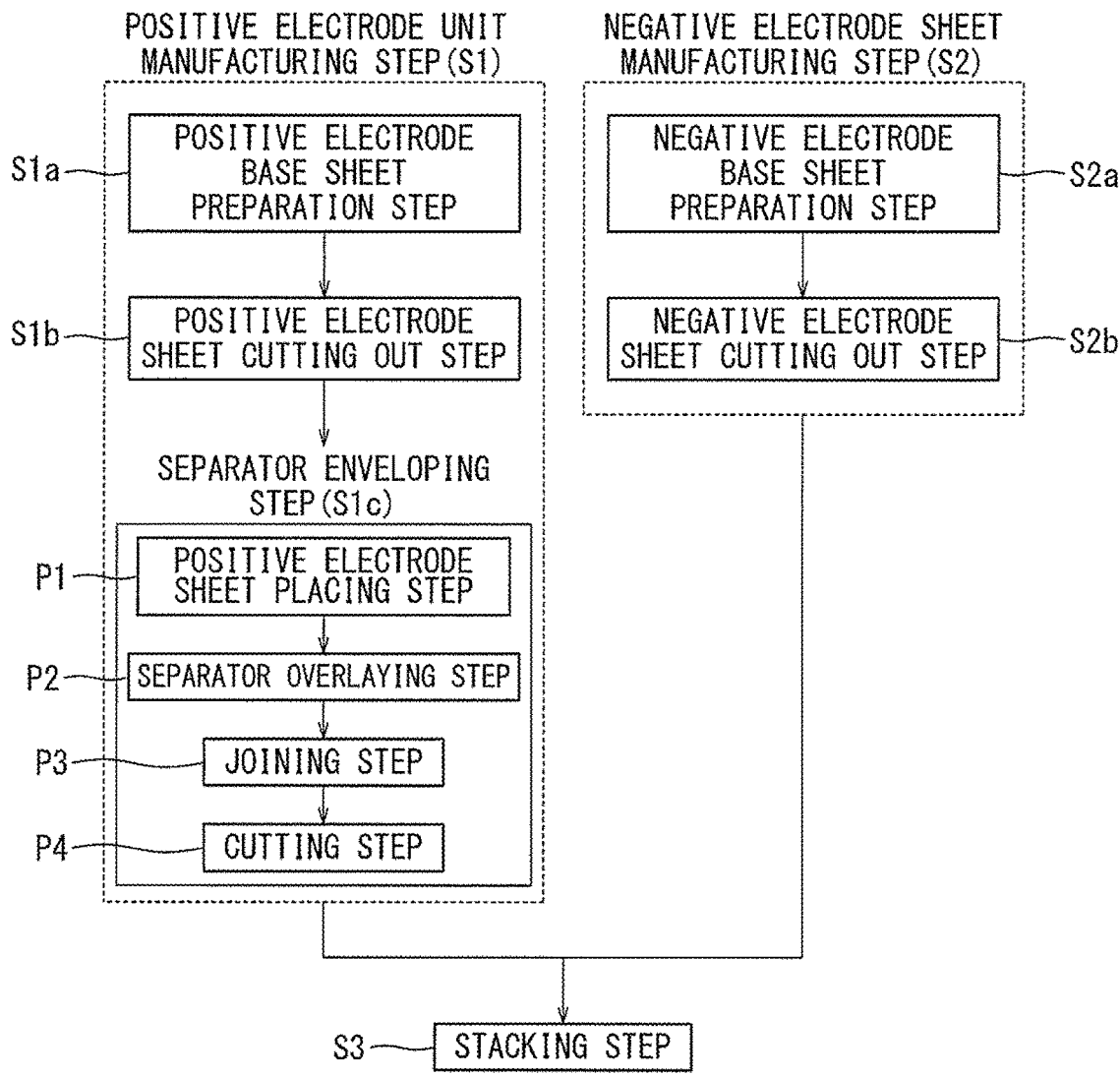
FIG. 9 is a flow chart showing manufacturing steps of the electrode assembly.

Subsequently, a method for manufacturing the electrode assembly 20 will be described. As shown in FIG. 9, a method for manufacturing the electrode assembly 20 comprises a positive electrode unit manufacturing step S1, a negative electrode sheet manufacturing step S2 and a stacking step S3. The positive electrode unit manufacturing step S1 comprises a positive electrode base sheet preparation step S1a (base sheet preparation step), a positive electrode sheet cutting out step S1b (electrode sheet cutting out step) and a separator enveloping step S1c. The separator enveloping step S1c comprises several sub steps, including a positive electrode sheet placing step P1 (electrode sheet placing step), a separator overlaying step P2, a joining step P3 and a cutting step P4. The negative electrode sheet manufacturing step S2 comprises a negative electrode base sheet preparation step S2a and a negative electrode sheet cutting out step S2b. The positive electrode unit manufacturing step S1 and negative electrode sheet manufacturing step S2 may be performed in parallel or consecutively. "A method for manufacturing an electrode unit" according to the present invention may comprise each of the steps S1a, S1b and S1c in the positive electrode unit manufacturing method S1, as well as each of steps S2a and S2b in the negative electrode sheet manufacturing step S2.

Figure 10:
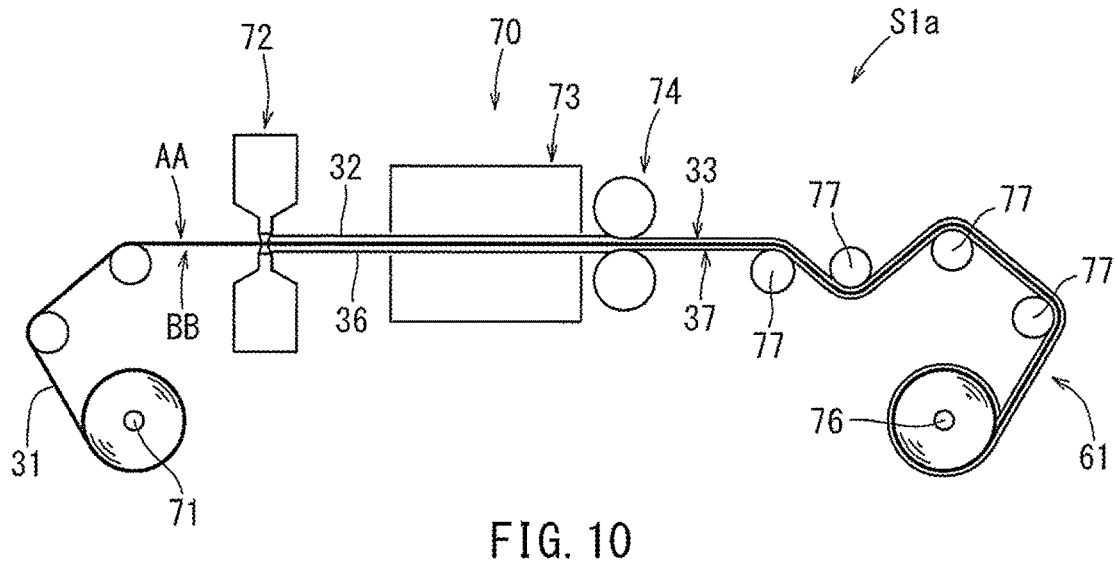
FIG. 10 is a schematic side view of a coating/drying device.

As shown in FIG. 10, a coating/drying device 70 may be used for the positive electrode base sheet preparation step S1a. The coating/drying device 70 includes a feed roller 71, coaters 72, a dryer 73, press rollers 74 and a roll-up roller 76. A strip-shaped positive electrode metal foil 31 is rolled up on the feed roller 71. The positive electrode metal foil 31 is rolled out of the feed roller 71 and passes through the coaters 72, dryer and press rollers 74 in succession. A predetermined tension is applied to the positive electrode metal foil 31. An active material layer for the positive electrode is applied on the first face AA and the second face BB of the positive electrode metal foil 31, respectively by the coaters 72. Consequently, the first face positive electrode active material layer 32 is formed on the first face AA, and the second face positive electrode active material layer 36 is formed on the second face BB. After said active material layers have been coated on positive electrode metal foil 31, both of the positive electrode active material layers 32 and 36 are dried by the dryer 73 and compressed by the press rollers 74 in the thickness direction of the foil. In this way, the positive electrode base sheet 61 may be completed. More specifically, the positive electrode base sheet 61 may include the strip-shaped positive electrode metal foil 31, the first face positive electrode active material layer 32 formed on its first face AA and the second face positive electrode active material layer 36 formed on the second face BB. Both of the positive electrode active material layers 32 and 36 may include the first face parallel section 33 and the second face parallel section 37 on their surfaces in the thickness directions respectively, as already described. The positive electrode base sheet 61 is rolled up by the roll-up roller 76 while being stretched by each of the rollers 77.

Figure 11:
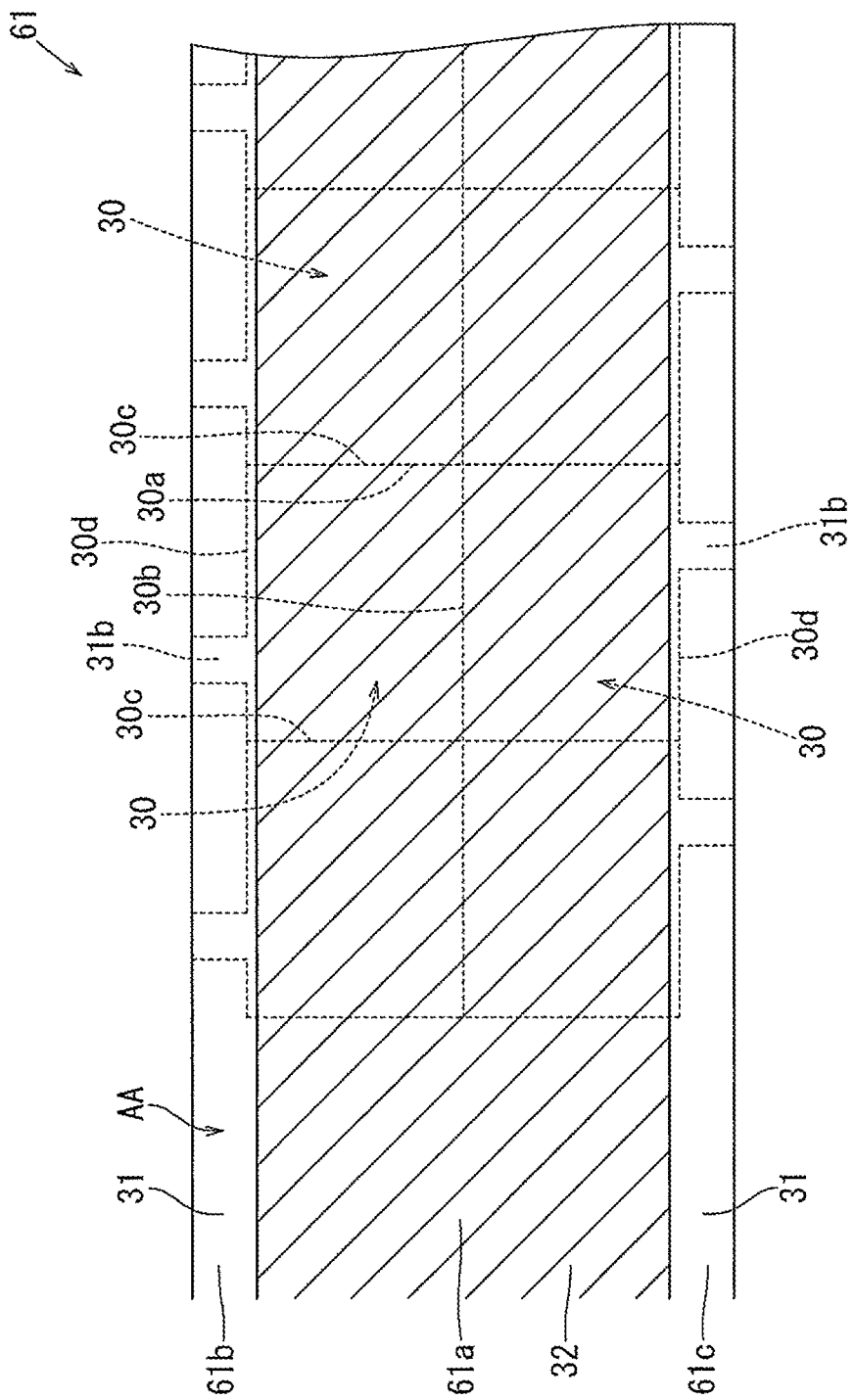
FIG. 11 is a plan view of a positive electrode base sheet.

FIG. 11 is a plan view as viewed from the side of the first face AA. As shown in FIG. 11, the positive electrode base sheet 61 includes an active material formation area 61*a*. The active material formation area 61*a* is indicated by hatching in FIG. 11. The first face positive electrode active material layer 32 may be formed on this active material formation area 61*a*. The active material formation area 61*a* may be provided in the widthwise central region of the positive electrode base sheet 61, extending throughout the entire longitudinal length of the positive electrode base sheet 61. The width of the active material layer formation area 61*a* corresponds to substantially twice the length of the positive electrode first lateral side 30*a*. Both sides of the positive electrode base sheet 61 at the widthwise ends of the base sheet 61 are the metal foil exposed areas 61*b* and 61*c* where the positive electrode metal foil 31 is exposed. Both metal foil exposed areas 61*b* and 61*c* continuously extend over the entire longitudinal length of the positive electrode base sheet 61. The width of both metal foil exposed areas 61*b* and 61*c* respectively correspond to the length of the positive electrode tab 31*b* in the extending direction, outward from positive electrode metal foil 31. In FIG. 11, lines to be cut by the laser LS (see FIG. 12), which will be described below, are indicted by dotted lines. The width direction of the positive electrode base sheet 61 spans two positive electrode sheets, and therefore two positive electrode sheets 30 are cut out in the width direction of the positive electrode base sheet 61. The positive electrode base sheet 61 is continuously spun out lengthwise by the feed roller 71 as described, and is therefore continuously cut out in the longitudinal direction of the positive electrode base sheet 61. The positive electrode tab opposing sides 30*b* of vertically adjacently arranged positive electrode sheets 30 in the widthwise direction of the positive electrode base sheet 61 as shown in FIG. 11 are coincident with each other, forming a contiguous border. The positive electrode first lateral side 30*a* and the positive electrode second lateral side 30*c* of horizontally adjacently arranged positive electrode sheets 30 in the longitudinal lengthwise direction of the positive electrode sheet 61 as shown in FIG. 11 are coincident with each other, forming a contiguous border. The second face positive electrode active material layer 36 of the positive electrode base sheet 61 is formed on the opposite side of the positive electrode base sheet 61 by being coated on the area of the underside of 61 opposed to the active material formation area 61*a* with the positive electrode metal foil 31 interposed therebetween. The width of the active material layer formation area 61*a* may substantially correspond to the positive electrode first lateral side 30*a*. In this case, only one positive electrode sheets 30 may be cut out in the width direction of the positive electrode base sheet 61. The positive electrode base sheet 61 will be then conveyed in the positive electrode sheet cutting out step S1*b* as will be described next.

Figure 12:
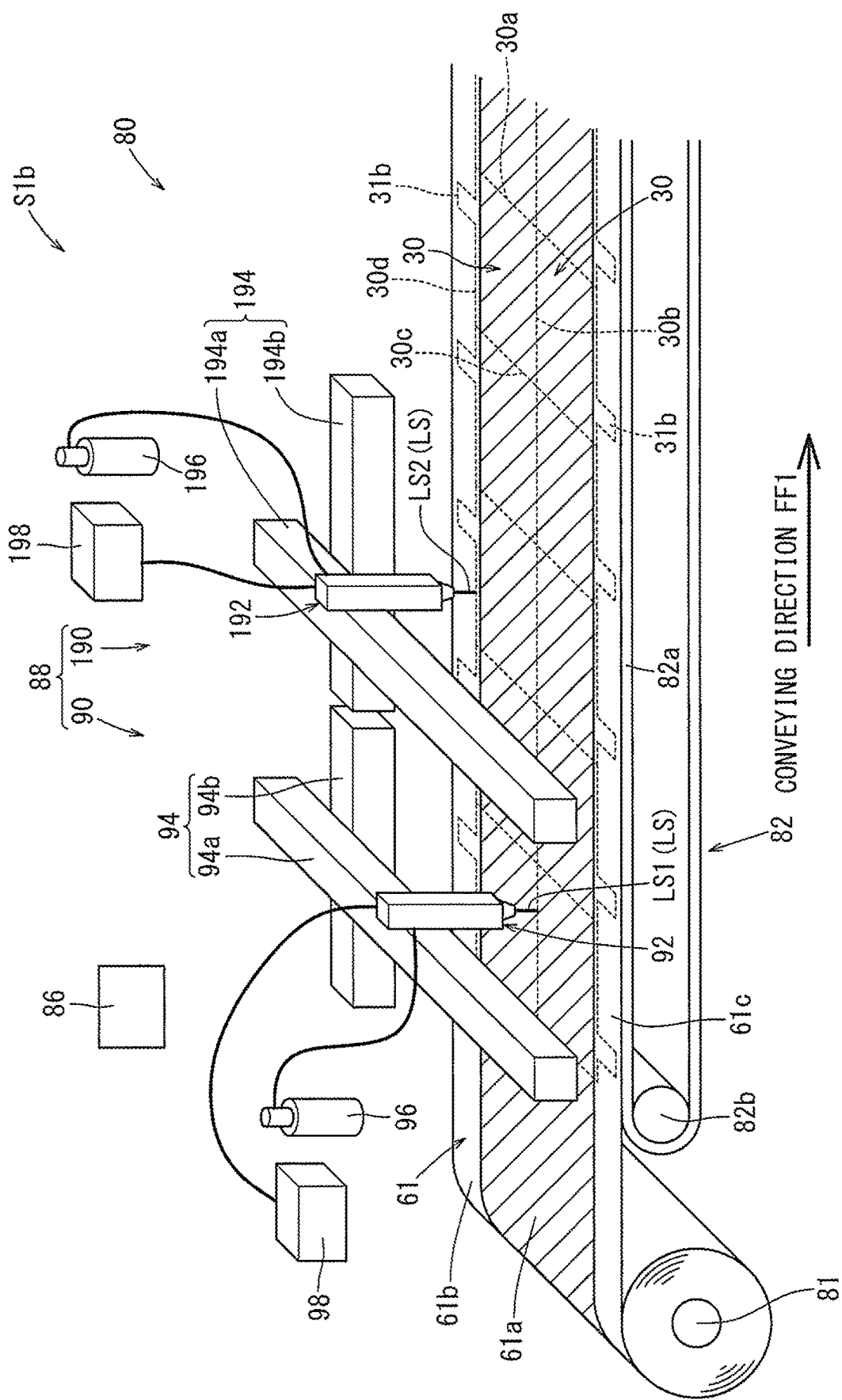
FIG. 12 is a schematic perspective view of a laser processor.

In the positive electrode cutting out step S1*b*, a laser processor 80 shown in FIG. 12 may be used. As shown in FIG. 12, the laser processer 80 includes a feed roller 81, a conveyor 82, a controller 86 and a laser apparatus 88. A strip-shaped positive electrode base sheet 61 is wrapped around the feed roller 81. The conveyor 82 may include a belt 82*a* attached in tension to the roller 82*b*.

As shown in FIG. 12, the laser apparatus 88 includes a first laser apparatus 90 for emitting a first laser beam LS1 to the active material layer formation area 61*a* and a second laser apparatus 190 for emitting a second laser beam LS2 to both of the metal foil exposed areas 61*b* and 61*c*. Hereinafter, each individual of both laser beams LS1 and LS2 will be distinguished as the first laser beam LS1 and the second laser beam LS2, and will be described as the laser beams LS when they are referred to collectively. There may be provided two second laser apparatuses 190 so as to correspond to the individual metal foil exposed areas 61*b* and 61*c*, which are spaced apart widthwise.

As shown in FIG. 12, the first laser apparatus 90 includes a laser head 92, an X-Y axis robot 94, an assist gas supplier 96 and a laser oscillator 98. The laser head 92 may be mounted to the X-Y axis robot 94. The X-Y axis robot 94 allows the laser head 92 to move in the X-Y direction. The X-Y robot 94 may include, an X-axis member 94*a* which movably supports the laser head 92 in the X-direction corresponding to the width direction of the positive electrode base sheet 61, and a Y-axis member 94*b* which movably supports the X-axis member 94*a* in the Y direction corresponding to the longitudinal direction of the positive electrode base sheet 61. The X-Y axis robot 94 allows movement of the laser head 92 in accordance with a program (s) stored in the controller 86, where movement may be according to a specific set of instructions.

As shown in FIG. 12, the assist gas supplier 96 may be connected to the laser head 92. The assist gas supplier 96 serves to supply the assist gas. The laser oscillator 98 may be connected to the laser head 92, for example, via a fiber optic cable. The laser oscillator 89 serves to controllably supply the laser beam to the laser head 92 based on control signals sent from the controller 86.

Figure 13:
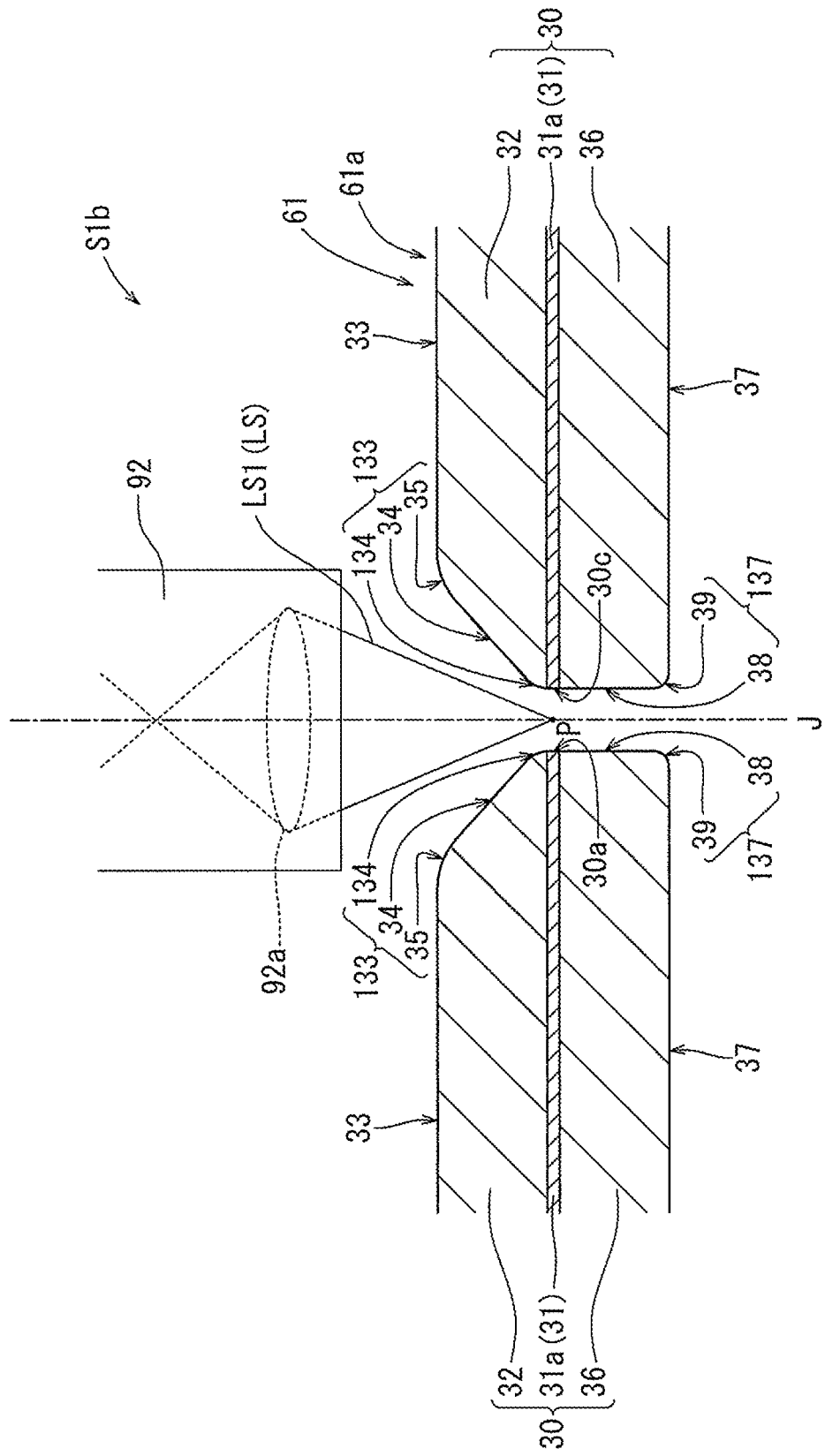
FIG. 13 is a cross-sectional view of the positive electrode base sheet being cut by a laser beam.

As shown in FIG. 13, the laser head 92 includes a lens 92*a*. The first laser beam LS1 may be focused by this lens 62*a* to focus the laser towards the focal point P that is set in a predetermined position relative to the positive electrode base sheet 61. The focal point P is set close to the center of the positive electrode metal foil 31 in the thickness direction, within the thickness of the positive electrode metal foil 31. Alternatively, the focal point P may also be set within the first face positive electrode active material layer 32 close to the positive electrode metal foil 31 or within the second face positive electrode active material layer 36 close to the positive electrode metal foil 31. The first laser beam LS1 may be emitted so that it traverses through the thickness direction of positive electrode sheet 30, starting from the side of the first face positive electrode active material layer 32 and continuing through to the opposite side of the second face positive electrode active material layer 36.

As shown in FIG. 13, the first laser beam LS1 is emitted such that its optical axis J extends perpendicularly to the positive electrode base sheet 61. Therefore, because of this orientation, the linear distance of the first laser beam LS1 traversing through the thickness direction of the positive electrode base sheet 61, passing through both positive electrode active material layers 32 and 36 as well as the positive electrode metal foil 31, will be the shortest distance, unlike the case where the first laser beam LS1 itself is emitted diagonal to the positive electrode base sheet 61. Therefore, because the distance of emission is comparatively short, the output of the first laser beam LS1 may be set to be low. The optical axis J here is a straight line passing through the center of the lens 92a and the focal point P.

The first laser beam LS1 may be a continuous wave laser beam. The wave length of the first laser beam LS1 may preferably be set within the range of 300 to 1100 nm. The spot diameter of the first laser beam LS1 may preferably be set within the range of 10 to 100 μm (micrometer). The cutting speed by the first laser beam LS1 may preferably be set within the range of 0.5 to 3 m/s. The output of the first laser beam LS1 may preferably be set within the range of 0.01 to 2.0 kW.

As shown in FIG. 12, the second laser apparatus 190 includes a laser head 192, an X-Y axis robot 194, an assist gas supplier 196 and a laser oscillator 198. The X-Y axis robot 194 may include an X-axis member 194a and a Y-axis member 194b. Each component 192, 194, 196 and 198 of the second laser apparatus 190 operates in an analogous manner to each corresponding component 92, 94, 96 and 98 of the first laser apparatus 90. The laser head 192 includes a lens (not shown). The second laser beam LS2 may be focused by this lens to focus the laser towards the focal point that is set in a predetermined position relative to the positive electrode base sheet 61. The focal point P is set close to the center of the positive electrode metal foil 31 in the thickness direction, within the thickness of the positive electrode metal foil 31. The second laser beam LS2 is emitted such that its optical axis J extends perpendicular to the positive electrode base sheet 61.

The second laser beam LS2 may be a pulse wave laser. The wave length of the second laser beam LS2 may preferably be set within the range of 500 to 1100 nm. The spot diameter of the second laser beam LS2 may preferably be set within the range of 25 to 100 μm (micrometer). The cutting speed by the second laser beam LS2 may preferably be set within the range of 1 to 3 m/s. The output of the second laser beam LS2 may preferably be set within the range of 10 to 100 W. The pulse width of the second laser beam LS2 may preferably be set narrower than 20 ps (picosecond). The repetition frequency of the second laser LS2 may preferably be set within the range of 01 to 1 MHz.

The operation of the laser processor 80 will be described. As shown in FIG. 12, the positive electrode base sheet 61 is rolled out of the feed roller 81 and conveyed under the predetermined tension of belt 82a in a conveying direction FF1. The positive electrode base sheet 61 is conveyed by the conveyor 82. The laser beam LS will be emitted from the laser apparatus 88 to cut this positive electrode base sheet 61. The first laser apparatus 90 emits the first laser beam LS1 to the active material layer formation region 61a. The first laser beam LS1 melts and cuts both positive electrode active material layers 32 and 36 (see FIG. 13) as well as the positive electrode metal foil 31 in the active material layer formation region 61a. The assist gas supplied from the assist gas supplier 96 blows the melted parts of both positive electrode active material layers 32 and 36 as well as the positive electrode metal foil 31 away. The second laser apparatus 190 emits the second laser beam LS2 to melt and cut both metal foil exposed regions 61b and 61c. The second laser beam LS2 melts and cuts the positive electrode metal foil 31 at both metal foil exposed regions 61b and 61c. The assist gas supplied from the assist gas supplier 196 blows the melted parts of the positive electrode metal foil 31 away.

The lines to be cut by the laser beams LS are indicated by the dotted lines in FIG. 12. The first laser beam LS1 cuts out the positive electrode tab opposing side 30b at the widthwise center of the active material layer formation region 61a lengthwise along the longitudinal direction of the positive electrode base sheet 61. Further, the first laser beam LS1 also cuts out the positive electrode first lateral side 30a and the positive electrode second lateral side 30c widthwise along the widthwise direction of the positive electrode base sheet 61. The second laser beam LS2 cuts out the positive electrode tab side 30d lengthwise along the longitudinal direction of the positive electrode base sheet 61 at the border between the metal foil exposed regions 61b and 61c and the active material layer formation region 61a. Moreover, the second laser beam LS2 also cuts out the positive electrode tabs 31b projecting outward from 30d in both respective metal foil exposed regions 61b and 61c. In this way, the positive electrode sheets 30 as a whole may be cut out of the positive electrode base sheet 61. As illustrated in FIG. 11 and explained above, the positive electrode sheets 30 may be cut out side-by-side (where the width direction spans 2 sheets) in the width direction of the positive electrode base sheet 61, and continuously as unwound lengthwise by the roller 81 in the longitudinal direction of the positive electrode base sheet 61. The positive electrode tab side 30d may be cut on the active material formation area 61a by the first laser beam LS1. The active material layer formation area 61a is indicated by hatching in FIG. 12.

As shown in FIG. 13, the first laser beam LS1 forms the first face melted part 133 at the first face positive electrode active material layer 32 as well as the second face melted part 137 at the second face positive electrode active material layer 36. As already described, the first face melted part 133 may include the first face curved section 35, first face tapered section 34 and first face edge section 134. The second face melted part 137 may have the second face orthogonal section 38 and second face curved section 39. As shown in FIG. 13, the first laser beam LS1 is focused in an inverse cone shape so that it is emitted perpendicular to the longitudinal axis of first electrode base sheet 61. As a result, the first face melted part 133 and second face melted part 137 may be formed symmetrical on both sides across the cutting axis J of the first laser LS1. The positive electrode sheets 30 cut out by the laser beam LS may be stored, for example, in the stack box (not shown) and conveyed to a separator enveloping step S1c as will be described next. Since the first face melted part 133 and the second face melted part 137 are formed by melting with the first laser beam LS, these first face melted part 133 and the second face melted part 137 comprise a smooth surface without burrs. As shown in FIG. 7, the first separator curved section 55b and the first separator first inclined section OP1 that respectively cover the first face curved section 35 and first face tapered section 34 of the first face melted part 133 in the joining step P3 as will be described later are prevented from being torn.

Figure 14:
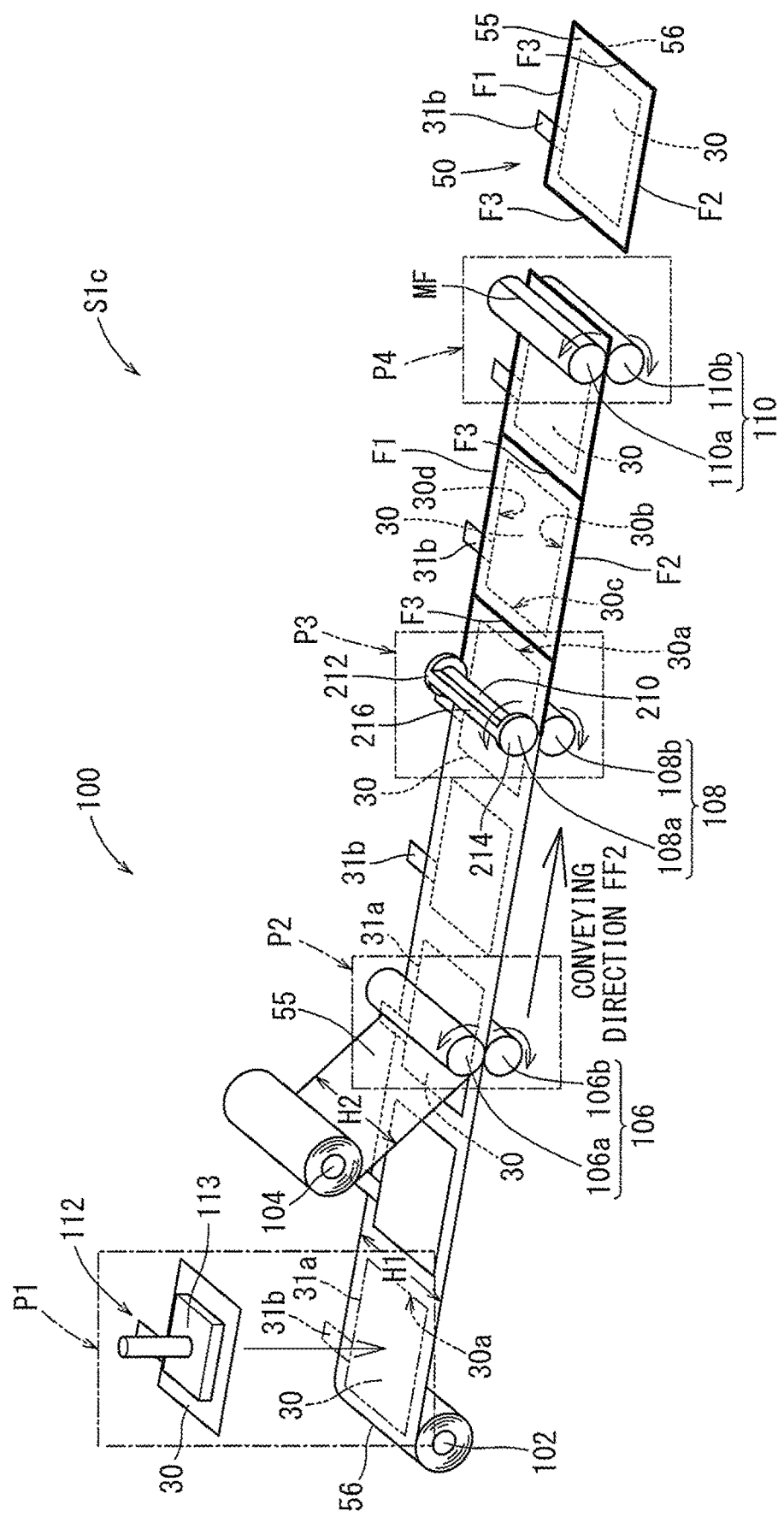
FIG. 14 is a schematic perspective view of a separator enveloping device.

As shown in FIG. 14, a separator enveloping device 100 may be used in the separator enveloping step S1c. The separator enveloping device 100 carries out each of the steps in order such as a positive electrode sheet placing step P1, a separator overlaying step P2, a joining step P3 and a cutting step P4. The separator enveloping device 100 may include a first feed roller 102, a suction hand 112, a second feed roller 104, a guide roller 106, a fuser roller 108 and a cutting roller 110.

A strip-shaped second separator 56 may be rolled up on the first feed roller 102. The width H1 of the second separator 56 is wider than the length of the positive electrode first lateral side 30a, widthwise as shown in FIG. 11.

Figure 15:
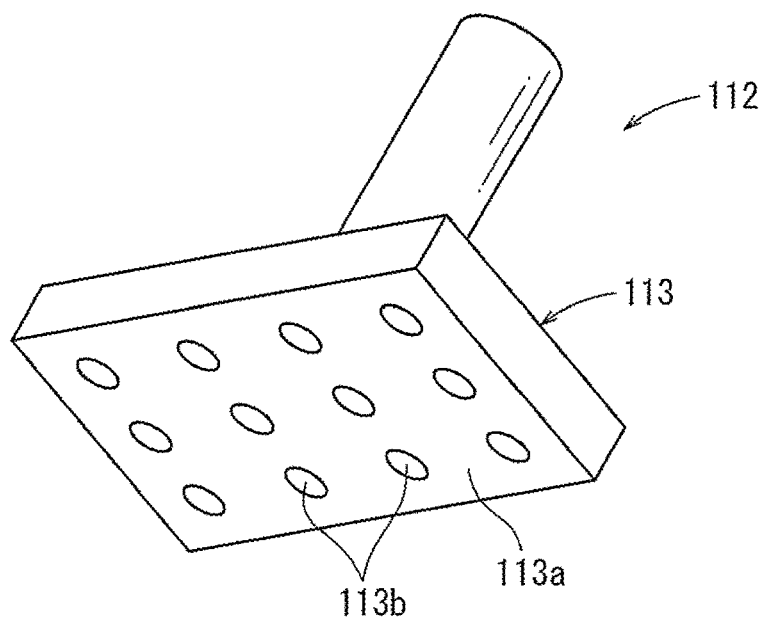
FIG. 15 is a perspective view of a suction hand.

The suction hand 112 may have a suction portion 113 (see FIG. 15) capable of selectively suctioning the positive electrode sheet 30 and releasing this suction. The suction portion 113 may have, for example, an opposing face 113a at the base of said suction portion, where said opposing face 113a contacts the top surface of the positive electrode sheet 30, wherein the opposing face 113a may be provided with a plurality of suction holes 113b.

As shown in in FIG. 14, a strip-shaped first separator 55 is rolled up on the second feed roller 104. The width H2 of the first separator 55 is substantially the same as the width H1 of the second separator 56. The guide roller 106 may have a first guide roller 106a and second guide roller 106b arranged as a symmetric vertically opposed pair of rollers aligned in a vertical direction.

Figure 16:
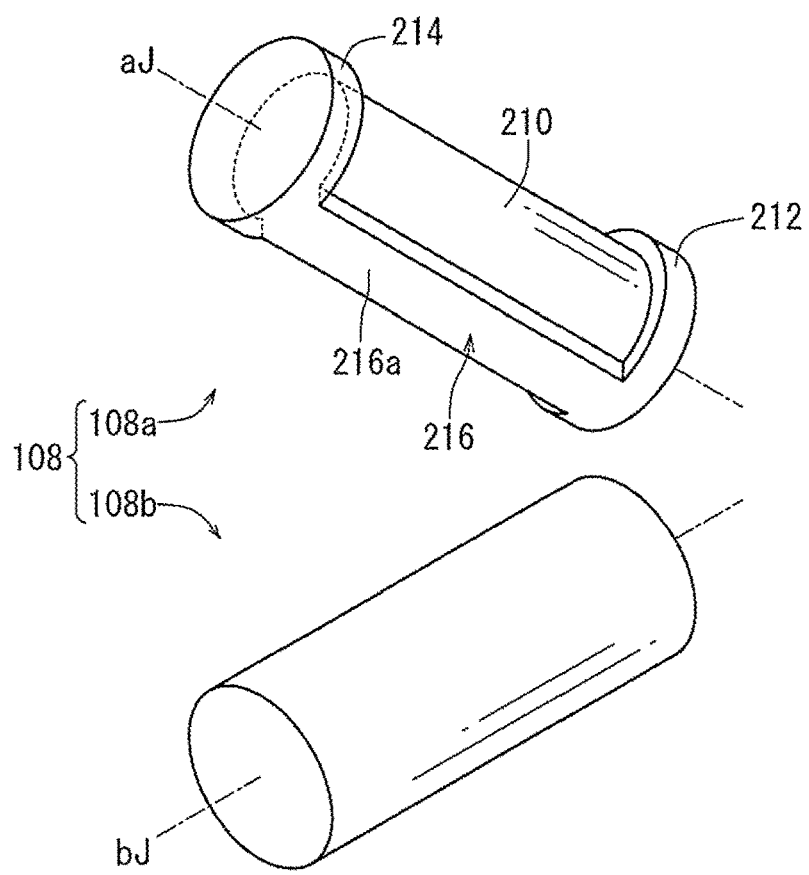
FIG. 16 is a perspective view of a fuser roller.

The fuser roller 108 may have a first fuser roller 108a and second fuser roller 108b arranged as a symmetric vertically opposed pair of rollers aligned in a vertical direction. The first fuser roller 108a (see FIG. 16) may have a first heating disc portion 212 and second heating disc portion 214 having a larger diameter than that of the circular cross-section of the roller main body 210, on both opposing ends in its longitudinal axial aJ-direction. Further, a heating protrusion 216 is provided on the outer peripheral surface of the roller main body 210 of the first fuser roller 108a protruding from the outer peripheral surface in a radial direction. The heating protrusion 216 extends over the length of the longitudinal axial aJ direction over both of the heating disc portions 212 and 214 at a predetermined location along the circumferential direction of the roller main body 210. The radius of the outer peripheral surface 216a of the heating protrusion 216 from the center of 210 to the outer radial extent of 216a is equivalent to the radius of both heating disc portions 212 and 214. The temperature of the heating protrusion 216 and both heating disc portions 212 and 214 may be set at which the first separator 55 and the second separator 56 can be fused together. The second fuser roller 108b may have a cylindrical shape, with no unevenness is formed in the longitudinal axial bJ direction.

As shown in FIG. 14, the cutting roller 110 includes a first cutting roller 110a and second cutting roller 110b. The first cutting roller 110a has a blade MF extending between its both ends.

Hereinafter, the operation of the separator enveloping device 100 will be described. As shown in FIG. 14, the second separator 56 is rolled out of the first feed roller 102. The second separator 56 is conveyed under predetermined tension in a conveying direction FF2. A positive electrode sheet placing step P1 may be carried out on the second separator 56. In the positive electrode sheet placing step P1, the suction hand 112 places the positive electrode sheet 30 on the second separator 56. To do this, the suction hand 112 first sucks the positive electrode sheet 30 cut out by the laser processor 80 (FIG. 12), and then conveys said sheet onto the second separator 56. The suction hand 112 then releases the suction of the positive electrode sheet 30 on the second separator 56 to place the positive electrode sheet 30 on the second separator 56. The positive electrode sheet 30 may be placed on the second separator 56 such that the side of the second face positive electrode active material layer 36 faces downward, and positive electrode tab 31b sticks out from the upper left corner of the current collector 31a (see FIG. 5) such that the positive electrode current collector 31a is located within the area of the second separator 56.

The separator overlaying step P2 may be carried out (see FIG. 14) after the positive electrode sheet placing step P1. The first separator 55 is rolled out of the second feed roller 104, laid on top of the positive electrode sheet 30, which is in turn on top of strip shaped second separator 56, and then the first separator 55 together collectively with the positive electrode sheets 30 and second separator 56 is pressed from the upper and lower sides by guide rollers 106a and 106b, respectively. Both guide rollers 106a and 106b simultaneously convey and press these first separator 55, positive electrode sheets 30 and second separator 56 in the conveying direction FF2 while the separator 55 is overlaid on the positive electrode sheets 30 and the second separator 56. The first separator 55 may be over laid on the second separator 56 from the side of the first face positive electrode active material layer 32 (see FIG. 5) in a position where the positive electrode current collectors 31a are located within the area of the first separator 55.

A joining step P3 may be carried out after the separator overlaying step P2 (see FIG. 14). Both fuser rollers 108a and 108b press both separators 55 and 56 and the positive electrode sheets 30 from the upper and lower sides, respectively, and convey both separators 55 and 56 and positive electrode sheets 30 in the conveying direction FF2 while simultaneously welding both separators 55 and 56 together. The first heating disc portion 212 serves to weld the first welding regions F1 to attach them to each other. The first welding regions F1 are regions along the positive electrode tab side 30d at an outer periphery of the positive electrode tab side 30d, as shown on the right side of FIG. 14. The second heating disc portion 214 serves to weld the second welding regions F2 to attach them to each other. The second welding regions F2 are regions along the positive electrode tab opposing side 30b at an outer periphery of the positive electrode tab opposing side 30b, as shown on the right side of FIG. 14. The heating protrusion 216 serves to weld the third welding regions F3 to attach them to each other. The third welding regions F3 are regions between the adjacent positive electrode sheets 30 along the positive electrode first lateral side 30a and positive electrode second lateral side 30c. The above-described first separator joint section 55d and second separator joint section 56c (see FIG. 7) are formed at each of the welding regions F1, F2 and F3.

Figure 17:
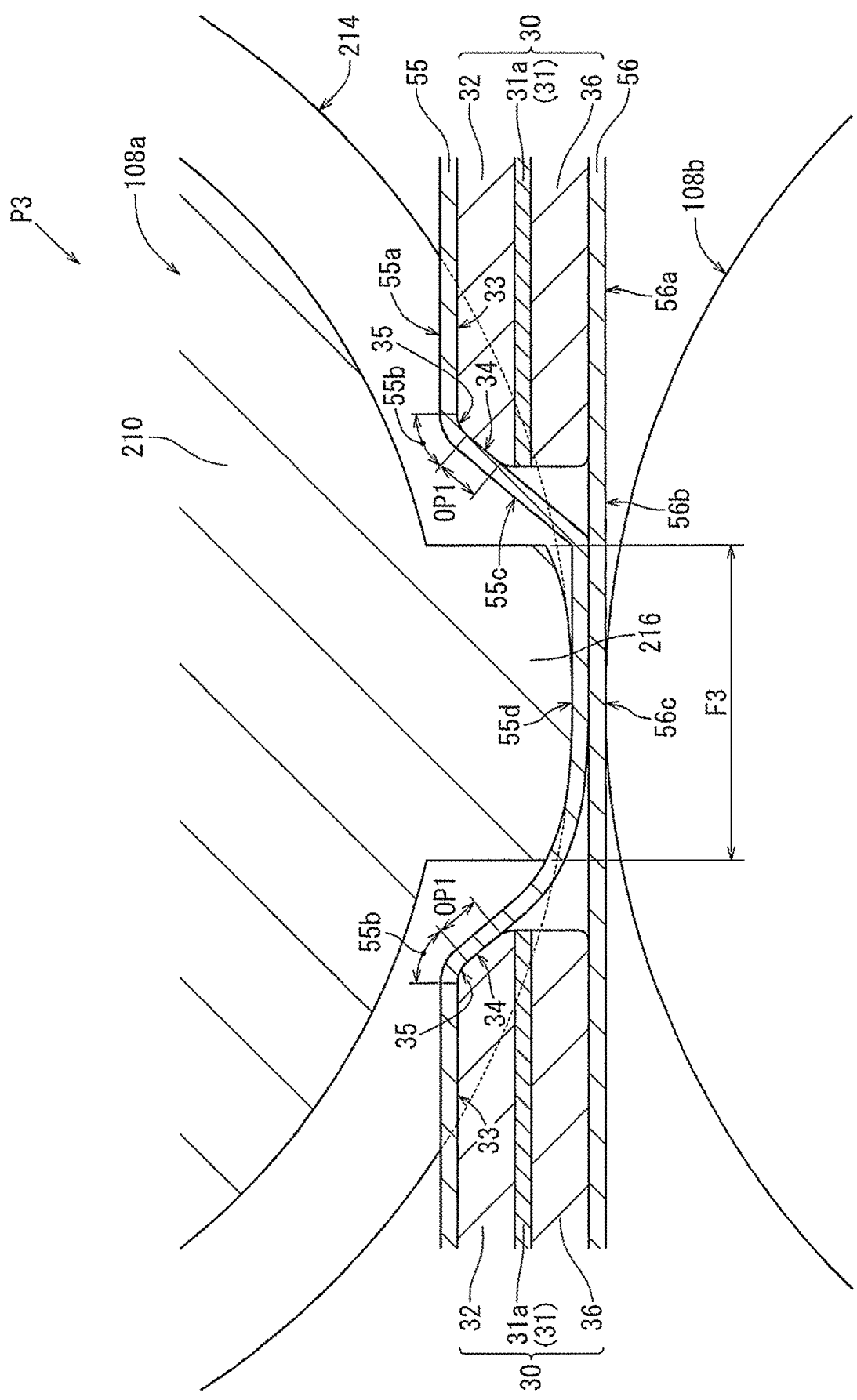
FIG. 17 is a cross-sectional view showing how the fuser roller melts the separator.

FIG. 17 shows how both separators 55 and 56 are welded in the third welding regions F3. In FIG. 17, the second fuser roller 108b is shown in a side view. As shown in FIG. 17, the first fuser roller 108a is positioned on the same side of the first separator 55 and the second fuser roller 108b is positioned on the same side of the second separator 56. The heating protrusion 216 of the first fuser roller 108a presses the first separator 55 against the second separator 56 to the extent of the thickness of the positive electrode sheet 30 and welds both separators 55 and 56 to each other. The second fuser roller 108b maintains the second separator 56 to be flush against the first separator 55 being pushed inward by the first fuser roller 108a. Both separators 55 and 56 may be welded to each other under predetermined tension on the first separator 55 such that the part of the first separator 55 opposed to the first tapered section 34 (first separator first inclined section OP1) may be arranged along the first tapered section 34. As already described, since the first face curved section 35 is formed as a curved surface at the curve between the first face parallel section 33 and first face tapered section 34, the first separator curved section 55b covering the first face curved section 35 is prevented from being stretched and torn even when the tension to push the separator 55 inward toward the side of the second separator 56 is applied on the first separator 55. Similar to the heating protrusion 216, both heating disc portions 212 and 214 (see FIG. 14) press the first separator 55 against the second separator 56 and weld separators 55 and 56 to each other.

A cutting step P4 may be carried out after the joining step P3 (see FIG. 14). In the cutting step P4, both cutting rollers 110a and 110b press both separator 55 and 56 and the positive electrode sheets 30 from the upper and lower sides, and convey both separators 55 and 56 and positive electrode sheets 30 in the conveying direction FF2. The blade MF of the first cutting roller 110a cuts both separators 55 and 56 between the adjacent positive electrode sheets 30 along the width direction. In this way, the positive electrode unit 50 can be completed and cut out.

Hereinafter, the negative electrode sheet manufacturing step S2 will be described (see FIG. 9). The negative electrode sheet manufacturing step S2 comprises a negative electrode base sheet preparation step S2a and a negative electrode sheet cutting out step S2b. In the negative electrode sheet manufacturing step S2, the negative electrode base sheet having a strip-shaped negative electrode metal foil with the first face negative electrode active material layer and second face negative electrode active material layer on its both sides is prepared by using the coating/drying device 70 shown in FIG. 10. The preparation process of the negative electrode base sheet is similar to the preparation process of the positive electrode base sheet 61, therefore, redundant description will be omitted.

In the negative electrode sheet cutting out step S2b, the laser processer 80 shown in FIG. 12 may be used. The negative electrode sheets are cut out of the negative electrode base sheet by the laser processor 80. The negative electrode sheet cutting out process is similar to the cutting out process of the positive electrode sheets 30, therefore, redundant description will be omitted.

Figure 18:
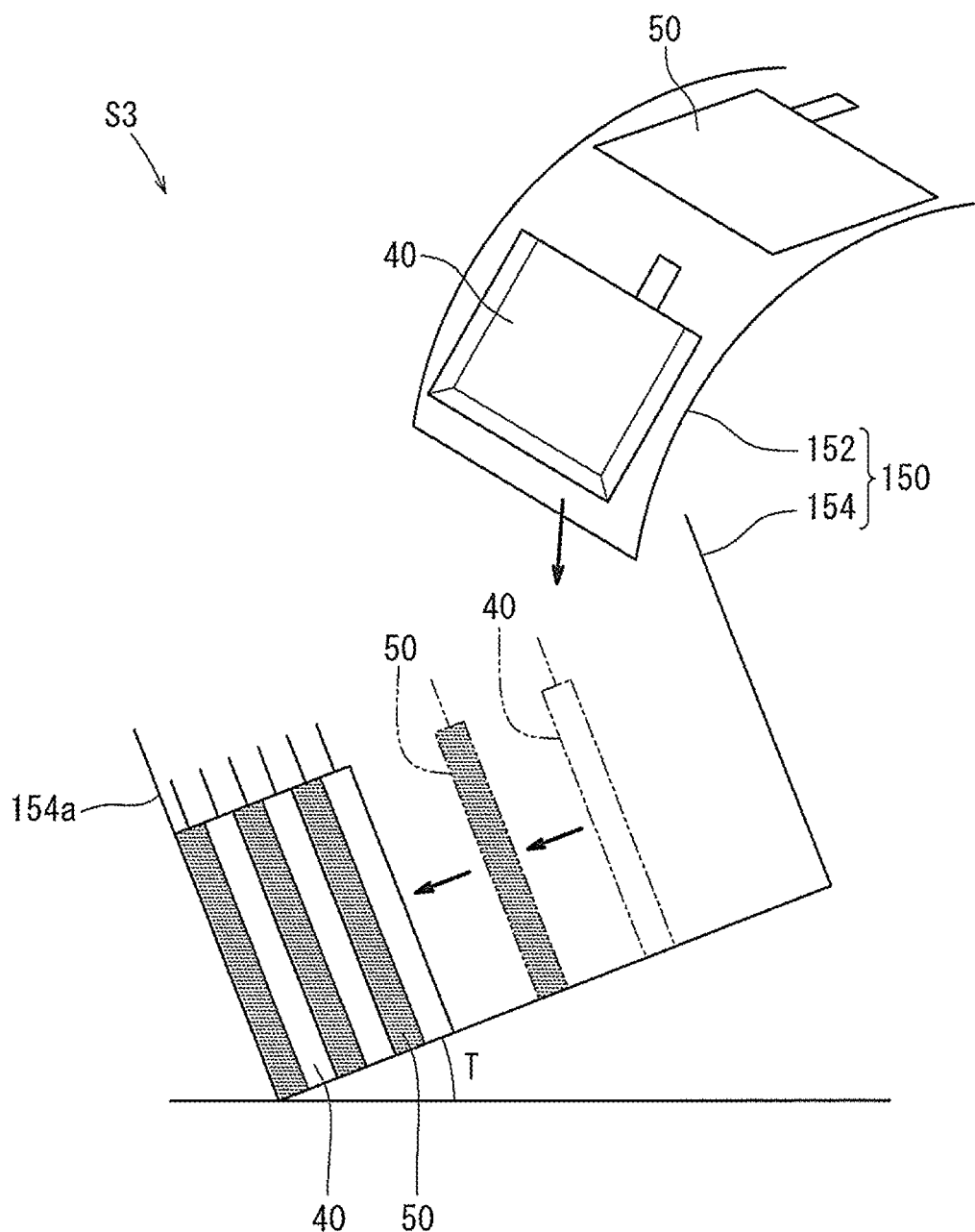
FIG. 18 is a perspective view of a laminating apparatus.

Hereinafter, a stacking step S3 (see FIG. 9) will be described. In the stacking step S3, a stacker 150 shown in FIG. 18 may be used. The stacker 150 may, for example, have a slide surface 152 and a stack box 154. The positive electrode units 50 and negative electrode sheets 40 are alternately conveyed in sequence from a conveyor (not shown) onto the slide surface 152. The positive electrode units 50 and negative electrode sheets 40 fall from the slide surface 152 into the stack box 154. The stack box 154 is inclined at a predetermined angle T relative to a horizontal plane. Therefore, the positive electrode units 50 and negative electrode sheets 40 that fall into the stack box 154 automatically move to a front side 154a of the stack box 154 due to gravitational force, and are stacked in order from the front side 154a. In this way, the electrode assembly 20 with alternately laminated positive electrode units 50 and negative electrode sheets 40 may be manufactured.

In the stacking step S3, the positive electrode units 50 are laminated with the first face AA of each of the positive electrode units 50 oriented in the same direction (see FIG. 2). Therefore, the stacking step S3 may easily be facilitated to accomplish the alternate stacking configuration without the need for any further steps because each positive electrode unit 50 manufactured in the separator enveloping step S1 needs only to be stacked alternately with the negative electrode sheets 40 with constantly the same orientation facing forward, without needing to reverse the front and back sides in the stacking step S3. Similarly, each of the negative electrode sheets 40 is laminated with the negative electrode first face CC oriented in the same direction (see FIG. 2). Therefore, the stacking step S3 may easily be facilitated to accomplish the stacking as described also because each negative electrode sheet 40 is manufactured in the negative electrode cutting out step S2b whereby after being manufactured the sheet 40 then needs only to be stacked alternately with the positive electrode units 50 with constantly the same orientation without reversing the front and back sides in the stacking step S3. The electrode assembly 20 manufactured in the stacking step S3 is sealed with electrolyte solution in the case 10 (see FIG. 1). In this way, the electric storage device 1 can be completed.

Although the exemplary embodiments for carrying out the present invention have been described above with reference to the drawings, the present invention is not limited to the structures, configurations, appearances, shapes, and the like described in the above embodiments. Various modifications, additions and deletions are possible as long as the essence of the invention is not changed. The mode of joining the first separator joint section 55d and the second separator joint section 56c is not limited to welding and the two components may be joined, for example, by bonding, etc. The method of forming the first face melted part 133 and the second face melted part 137 is not limited to melting by laser, and may be formed by melting, for example, with a hot blade or burner. The first face melted part 133 may be provided at only one or two side(s) of three sides that include the positive electrode first lateral side 30a, the positive electrode tab opposing side 30b and the positive electrode second lateral side 30c instead of all three sides. Similarly, the second face melted part 137 may be provided along the side or sides where the first face melted part 133 is correspondingly provided. The configuration in that "the first separator is disposed along the first face tapered section" described in the present disclosure may include a configuration where the first separator is disposed along a part of the first face tapered section as will be described below with reference to FIGS. 21 and 22. The positive electrode sheets 30 may include a tapered side and non-tapered side when they are provided at only one or two side(s) of three sides including the positive electrode first lateral side 30a, the positive electrode tab opposing side 30b and the positive electrode second lateral side 30c. The tapered side is the side where the first face tapered section 34 (see FIG. 7) or the first face coated tapered section 834 (see FIG. 8) on the first face AA of the positive electrode metal foil 31 is provided. The non-tapered side is a side where neither the first face tapered section 34 nor the first face coated tapered section 834 is provided. In the joining step P3, both separators 55 and 56 may be joined along the entire tapered sides and non-tapered sides when the positive electrode sheet 30 includes the tapered side and the non-tapered side. Alternatively, both separators 55 and 56 may also be joined along a part of the tapered sides and the entire non-tapered sides. Further alternatively, both separators 55 and 56 may be joined along the entire tapered sides and a part of the tapered sides. Further alternatively, both separators 55 and 56 may be joined along a part of the tapered sides and a part of the tapered sides. Further alternatively, both separators 55 and 56 may be joined along a part of the non-tapered sides and the entire non-tapered sides. Further alternatively, both separators 55 and 56 may be joined along the entire tapered sides or only a part of the tapered sides, while both separators 55 and 56 are not joined along the non-tapered sides. Still further alternatively, both separators 55 and 56 may be joined along the entire non-tapered sides or only a part of the non-tapered sides, while both separators 55 and 56 are not joined along the tapered sides.

Hereinafter, modifications in configuration of the peripheral edge around the first face positive electrode active material layer 32 and the second face positive electrode active material layer 36 will be described with reference to FIGS. 19 to 24. Redundant description will be omitted by providing the same reference numerals as of FIG. 7 to the parts in FIGS. 19 to 24 where the configuration and/or function are the same or substantially the same as in FIG. 7. While modifications of the peripheral edge around the first face positive electrode active material layer 32 and the second face positive electrode active material layer 36 in FIGS. 19 to 24 will be described with reference to the positive electrode first lateral side 30a, the configuration shown in FIGS. 19 to 24 may be adopted to the positive electrode tab opposing side 30b, the positive electrode second lateral side 30c and the positive electrode tab side 30d in an analogous manner.

Figure 19:
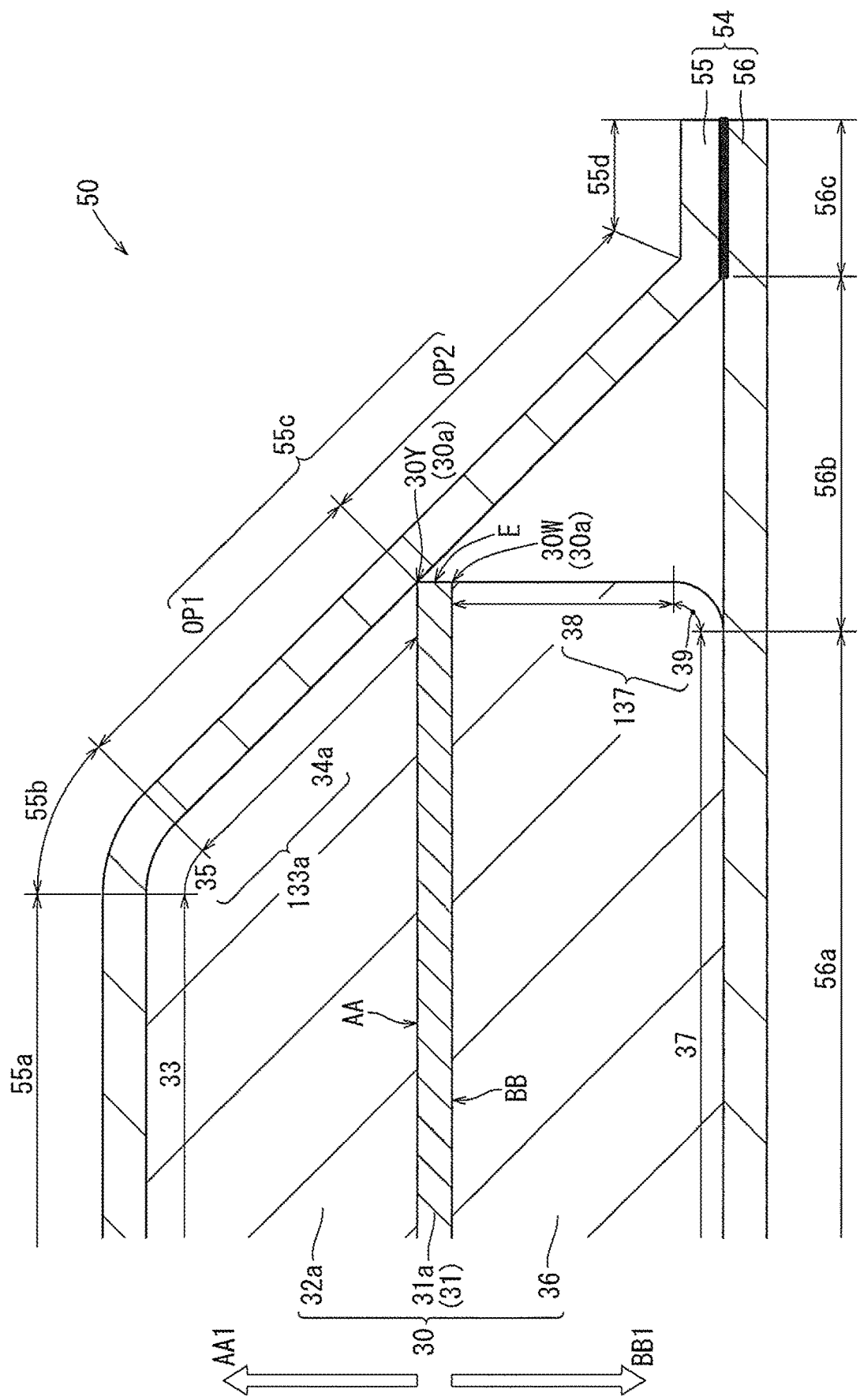
FIG. 19 is a cross-sectional view of a modified example of the positive electrode unit wherein the view corresponds to FIG. 7.

Instead of the first face melted part 133 shown in FIG. 7, the first face positive electrode active material layer 32a shown in FIG. 19 may be formed with the first face melted part 133a. The first face tapered section 34a may continuously extend from the first face positive electrode side 30Y to first face curved section 35 at a constant linear inclination in the first face melted part 133a. The first face tapered section 34a may be configured in a planar shape that is linearly inclined to the inner side of the positive electrode current collector 31a relative to the thickness direction shown by arrow AA1 indicating the thickness direction of the first face positive electrode active material layer 32a. The first separator first inclined section OP1 may be linearly arranged along the first face tapered section 34a so as to be flush against and contact the first face tapered section 34a from the first face curved section 35 up to first face positive electrode side 30Y.

Figure 20:
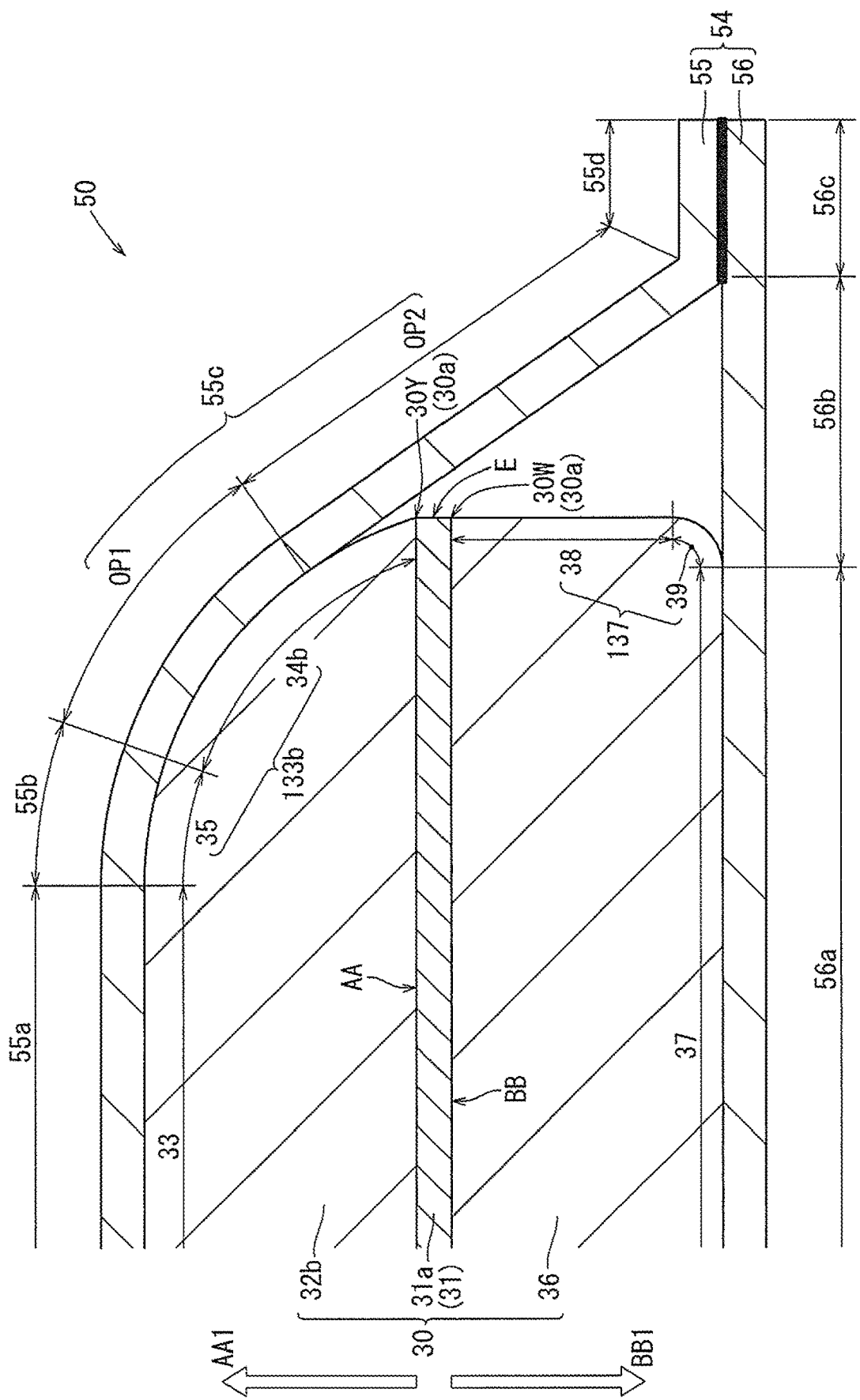
FIG. 20 is a cross-sectional view of a modified example of the positive electrode unit wherein the view corresponds to FIG. 7.

Instead of the first face melted part 133 shown in FIG. 7, the first face positive electrode active material layer 32b shown in FIG. 20 may be formed with the first face melted part 133b. The first face tapered section 34b may be formed to continuously extend at the first face melted part 133b from the first face positive electrode side 30Y to first face curved section 35 where the first face tapered section 34b is gently curved to form a curved surface and is inclined toward the inner side of the positive electrode current collector 31a relative to the thickness direction shown by arrow AA1 indicating the thickness direction of the first face positive electrode active material layer 32b. The first separator first inclined section OP1 is arranged so as to curve along a part of the first face tapered section 34b and to lie flush against and contact a part of the first face tapered section 34b. OP1 is, more specifically, a part excluding an area on the side of the first face tapered section 34b proximate to positive electrode side 30Y.

Figure 21:
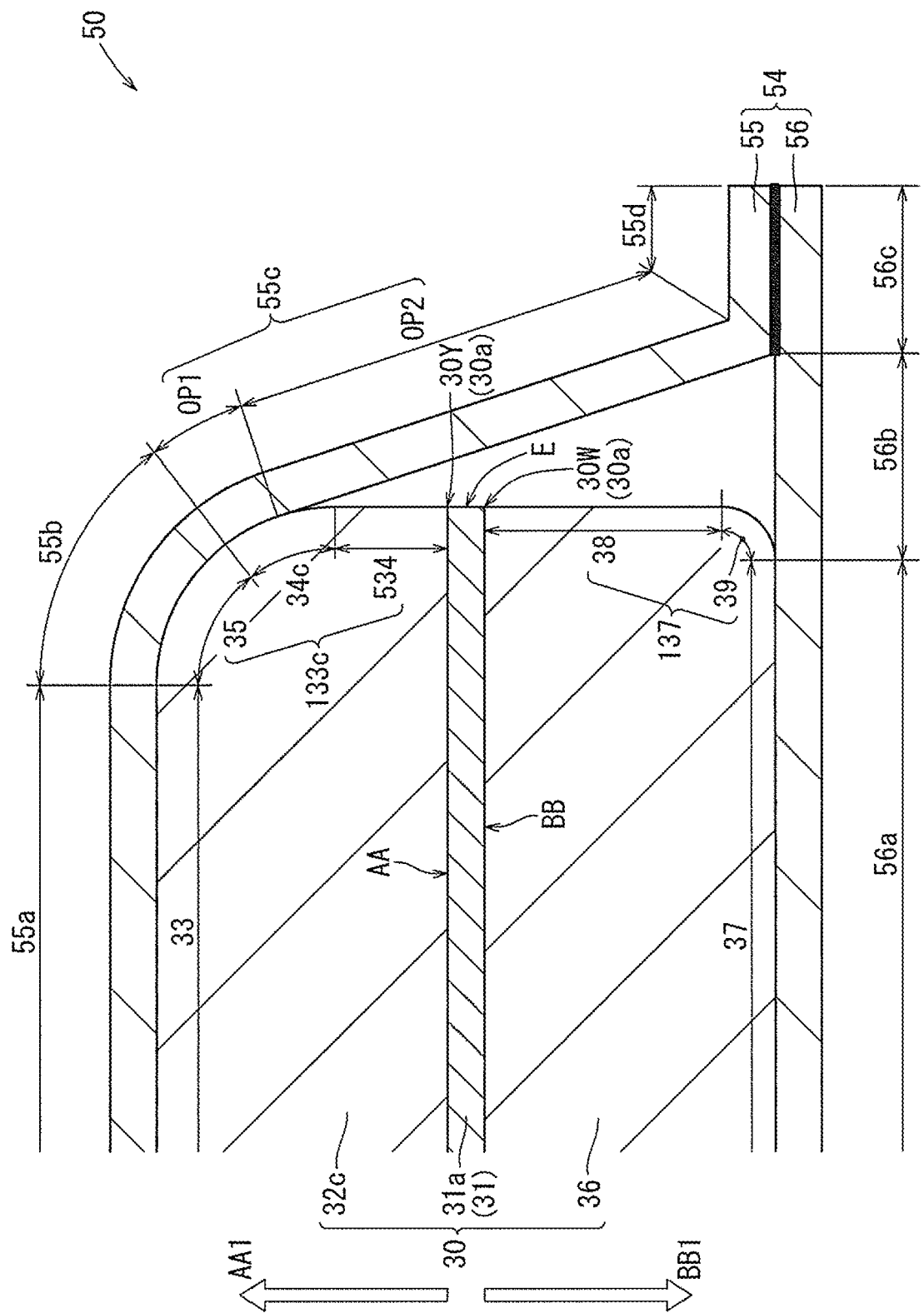
FIG. 21 is a cross-sectional view of a modified example of the positive electrode unit wherein the view corresponds to FIG. 7.

Instead of the first face melted part 133 shown in FIG. 7, the first face positive electrode active material layer 32c shown in FIG. 21 is formed with a first face melted part 133c. The first face melted part 133c may include a first face tapered section 34c and the first face orthogonal section 534 in addition to the first face curved section 35 as already described. The first face tapered section 34c is gently curved to form a rounded surface and is inclined to the inner side of the positive electrode current collector 31a relative to the thickness direction shown by arrow AA1 indicating the thickness of the first face positive electrode active material layer 32c and, more specifically, curved to form a rounded surface to extend across the first face curved section 35 and the first face orthogonal section 534 between the first face curved section 35 and the first face orthogonal section 534 which will be described next. The first face tapered section 34c forms a curved surface continuous with the first face curved section 35. The first face orthogonal section 534 is provided so as to extend continuously from the first face positive electrode side 30Y in a manner vertically orthogonal to the first face AA. The first separator first inclined section OP1 is arranged so as to curve along a part of the first face tapered section 34c so as to be flush with and in contact with the first face tapered section 34c. Said part of the first face tapered section 34c is, more specifically, a part excluding an area of the first face tapered section 34c on the side of the first face orthogonal section 534.

Figure 22:
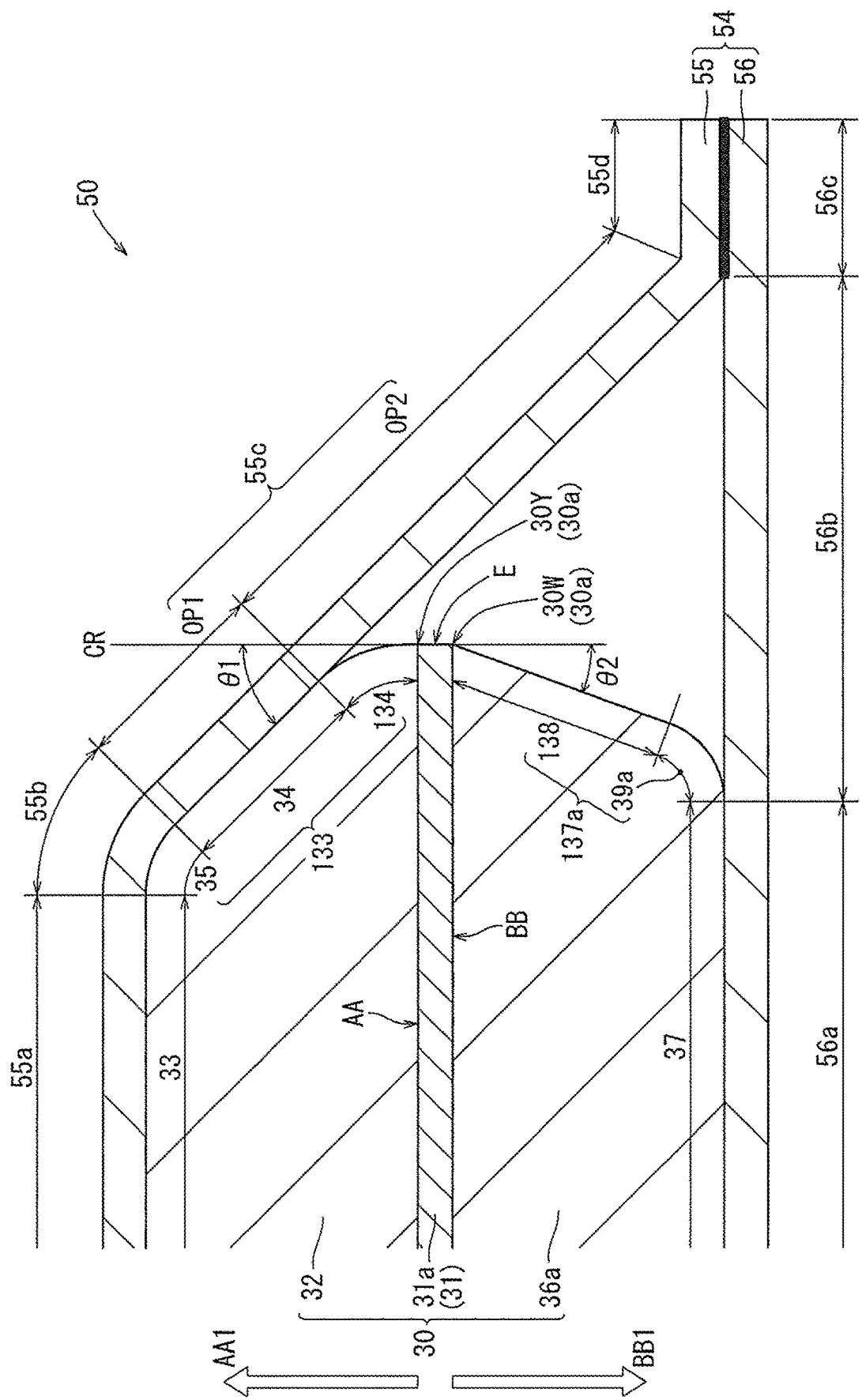
FIG. 22 is a cross-sectional view of a modified example of the positive electrode unit wherein the view corresponds to FIG. 7.

The first face positive electrode active material layer 32 shown in FIG. 22 includes a first face melted part 133 configured similarly to FIG. 7. The first face tapered section 34 is inclined toward the inner region of the positive electrode current collector part 31a at the first face inclination angle θ1 relative to the thickness direction AA1 (indicated by line CR) of the first face positive electrode active material layer 32. The first face inclination angle θ1 and the second face inclination angle θ2, which will be described later, are the angles from the reference line CR indicating the thickness direction, formed by extending the end face E of the positive electrode metal foil 31 outward. The second face positive electrode material layer 36a is formed with a second face melted part 137a instead of the second face melted part 137 as shown in FIG. 7. The second face melted part 137a may have a second face tapered section 138 and a second face curved section 39a. The second face tapered section 138 may continuously extend from the second face positive electrode side 30W inwards second face curved section 39a may be inclined at the second face inclination angle θ2 relative to the thickness direction BB1 (indicated by line CR), that is smaller than the first face inclination angle θ1, towards the inner region of the positive electrode collector part 31a in the thickness direction BB1 of the second face positive electrode active material layer 36a. The second face tapered section 138 may, for example, be configured in a planar shape that is linearly inclined. The second face curved section 39a may extend continuously to form a curved surface that extends between and across the second face tapered section 138 and the second face parallel section 37.

The first separator second inclined section OP2 may be arranged in an increasingly linearly spaced apart manner from the first face edge section 134, the end face E of the positive electrode metal foil 31, the second face tapered section 138 and the second face curved section 39a, in that order, as it extends from OP1 to 55d. Therefore, in this manner, the first separator second inclined section OP2 is prevented from contacting the first face edge section 134, the end face E, the second face tapered section 138 and the second face curved section 39a. As a result, the first separator second inclined section OP2 is prevented from being damaged by contacting the first face edge section 134, the end face E, the second face tapered section 138 and the second face curved section 39a. Further, the configuration shown in FIG. 22 may be modified so that the first face tapered section 34 and the second face tapered section 138 are inclined while being curved to form a rounded surface.

Figure 23:
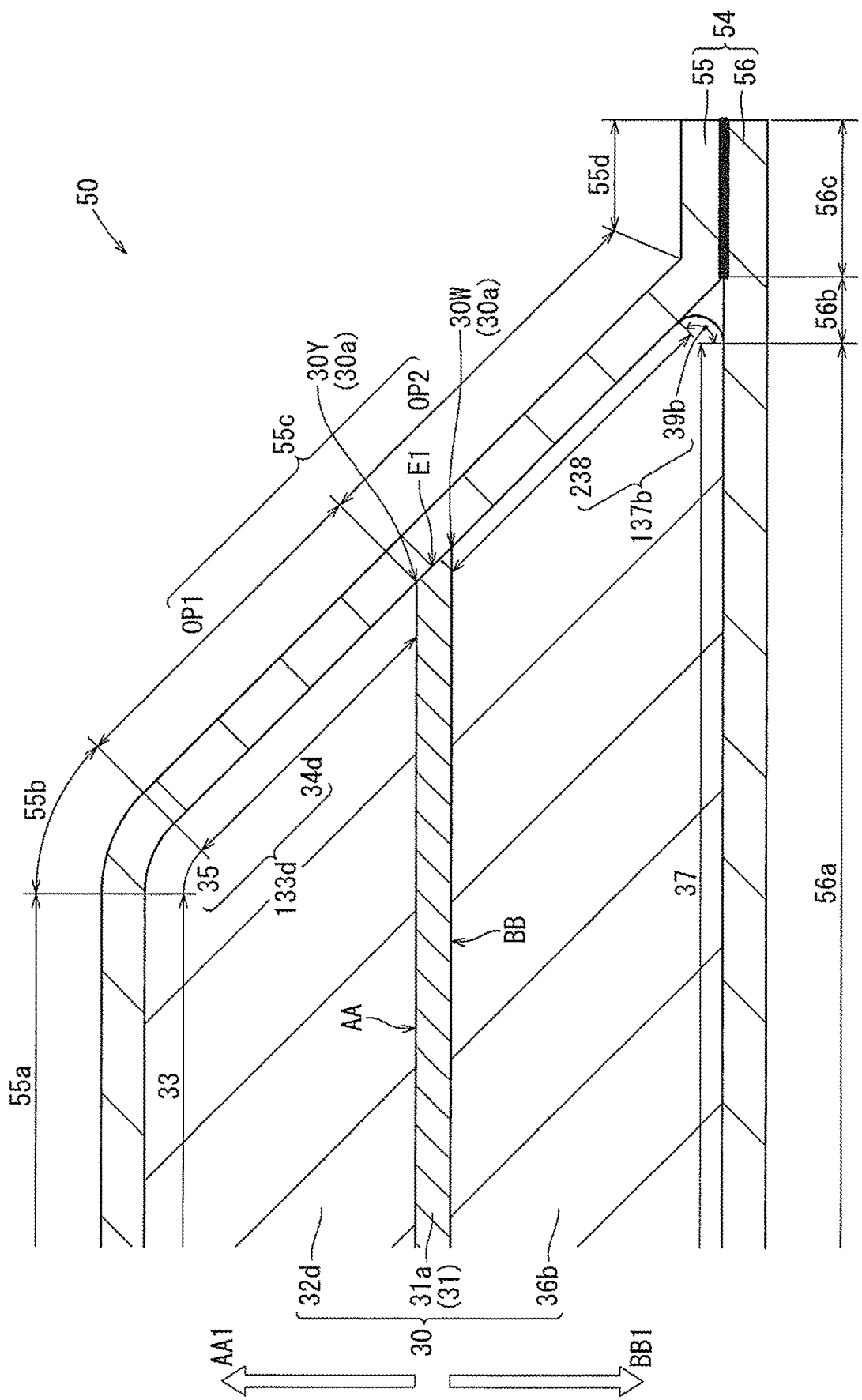
FIG. 23 is a cross-sectional view of a modified example of the positive electrode unit wherein the view corresponds to FIG. 7.

The first face positive electrode active material layer 32d shown in FIG. 23 may be formed with the first face melted part 133d that has substantially the same configuration as the first face melted part 133a shown in FIG. 19. More specifically, the first face tapered section 34d may continuously extend from the first face curved section 35 to the first face positive electrode side 30Y, and the first face tapered section 34d may be configured in a planar shape which is linearly inclined to the inner side of the positive electrode current collector part 31*a* relative to the thickness direction AA1 shown by arrow AA1 indicating the thickness direction of the first face positive electrode active material layer 32*d*. Instead of the second face melted part 137 shown in FIG. 7, the second face positive electrode active material layer 36*b* may be formed with the second face melted part 137*b*. The second face melted part 137*b* may include a second face outwardly tapered section 238 and a second face curved section 39*b*. The second face outwardly tapered section 238 may continuously extend at the same linear inclination as 34*d* from the second face positive electrode side 30W to second face curved section 39*b*, and the inclination may be oriented in an outward direction relative to the thickness direction BB1 as shown by the arrow of BB1 indicating the thickness direction of the second face positive electrode active material layer 36*b*. The second face curved section 39*b* continuously extends to form a curved surface that extends between and across the second face outwardly tapered section 238 and the second face parallel section 37. The end face E1 of the positive electrode metal foil 31 may be formed in a planar shape inclined to the first face AA and second face BB, more specifically, the end face E1 is inclined from the second face positive electrode side 30W toward the first face positive electrode side 30Y at the same inclination as 34*d* and 238. In this way, the first face tapered section 34*d*, the end face E and the second face outwardly tapered section 238 constitute one continuous planar shape.

The first separator first inclined section OP1 may be linearly arranged along the first face tapered section 34*d* to be flush against and contact the first face tapered section 34*d*. The first separator second inclined section OP2 may be linearly arranged along the end face E1 of the positive electrode metal foil 31 and the second face outwardly tapered section 238 to remain flush against and contact the end face E1 as well as the second face outwardly tapered section 238. Since the first separator first inclined section OP1 and the first separator second inclined section OP2 are arranged along one continuous face at a constant slope defined by the first face tapered section 34*d* according to the configuration shown in FIG. 23, the end face E1 of the positive electrode metal foil 31 and the second face outwardly tapered section 238, the first separator first inclined section OP1 and the first separator second inclined section OP2 are prevented from being stretched and torn. Further, since the area from the first face tapered section 34*d* to the second face outwardly tapered section 238 defines a continuous inclined face oriented outwardly from the positive electrode sheet 30 according to the configuration shown in FIG. 23, the load applied to the peripheral edge of the first face parallel section 33 due to the lamination with the negative electrode sheet 40 is dispersed from the first face tapered section 34*d* to the outer side of the positive electrode sheet 30 toward the second face outwardly tapered section 238. As a result, the load applied to the peripheral edge of the first separator parallel section 55*a*, which is a part of the separator covering the peripheral edge of the first face parallel section 33, is reduced so that the peripheral edge of the first separator parallel section 55*a* is restricted or prevented from being torn. Further, it is also possible to modify the configuration shown in FIG. 23 such that, for example, the first face tapered section 24*d*, the end face E1 of the positive electrode metal foil 31 and the second face outwardly tapered section 238 may be configured to define one continuous curved face.

Figure 24:
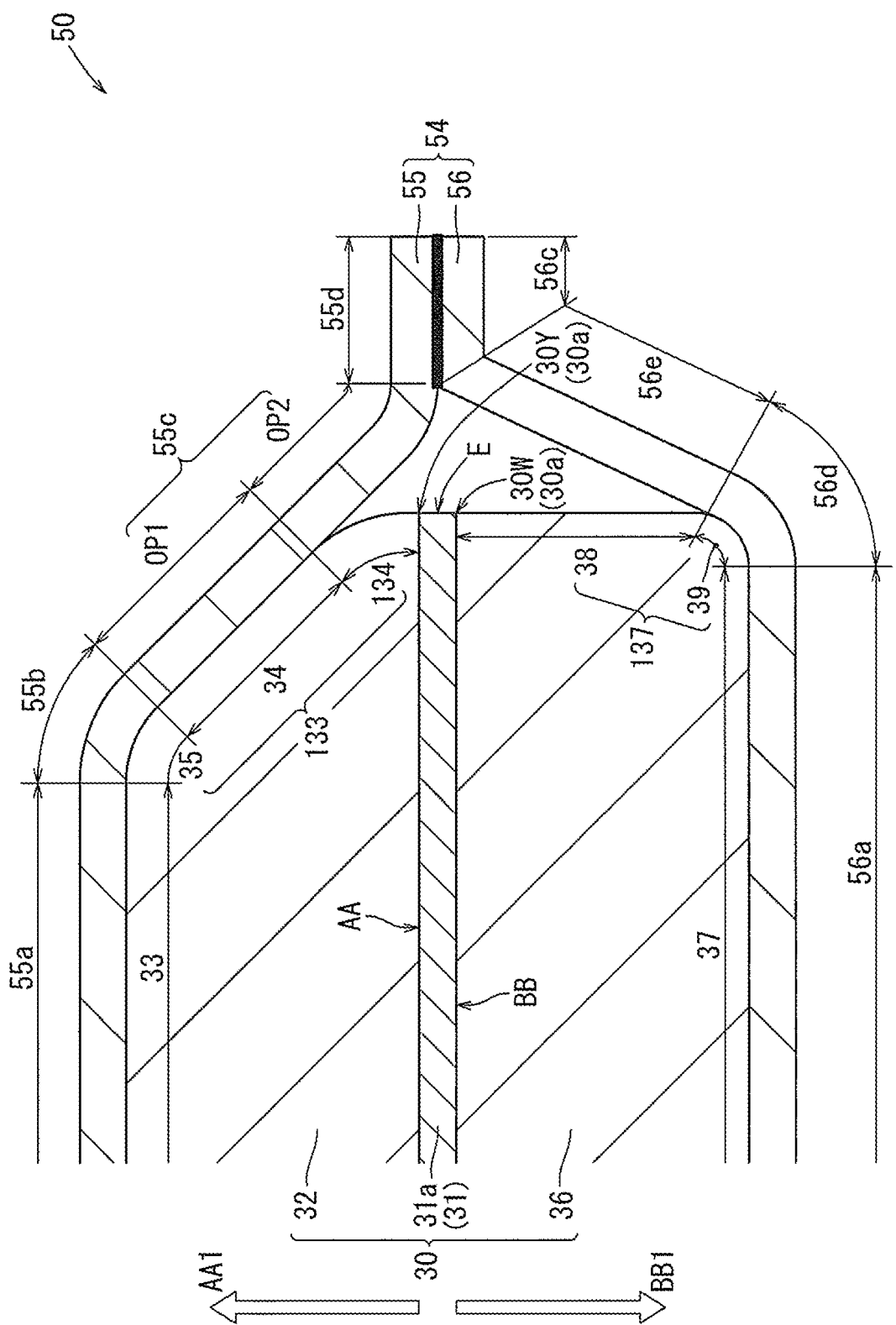
FIG. 24 is a cross-sectional view of a modified example of the positive electrode unit wherein the view corresponds to FIG. 7.

According to the configuration shown in FIG. 24, the first separator joint section 55*d* and the second separator joint section 56*c* are welded to each other at the same location in the thickness direction corresponding to the center of the positive electrode metal foil 31 in the thickness direction. The second separator 56 may have the second separator curved section 56*d* and the second separator inclined section 56*e* between the second separator parallel section 56*a* and the second separator joint section 56*c*. The second separator curved section 56*d* may be arranged so as to curve along the second face curved section 39 to contact the second face curved section 39. The second separator inclined section 56*e* may be arranged so as to be inclined toward the side of the first separator 55 with respect to the second separator parallel section 56*a*, and may be arranged such that it inclines outward relative to the second face orthogonal section 38. In this manner, the second separator inclined section 56*e* may be increasingly linearly spaced apart from the second face orthogonal section 38, from the second separator curved section 56*d* to the second separator joint section 56*c*. As already described, the second face curved section 39 is configured as a melted part and is formed to have a curved surface. Therefore, the second face curved section 39 is formed of a smooth surface without burrs. Consequently, the second separator curved section 56*d* covering the second face curved section 39 is prevented from being torn. Since the second separator 56 of the configuration in FIG. 24 includes the second separator inclined section 56*e*, the second separator 56 can be disposed more closely to the side of the first separator 55. Due to this configuration, both separator joint sections 55*d* and 56*c* can be joined while the first separator inclined section 55*c* is configured to be shorter than the case where, for example, the second separator 56 is arranged flush with the second face parallel section 37, so that the load burden on the first separator inclined section 55*c* can be reduced. Therefore, the first separator inclined section 55*c* is prevented from being torn.

Hereinafter, the modification examples will be described except the peripheral edge of the first face active material layer 32 and the second face active material layer 36. The configuration of the coating/drying device 70, the laser processor 80 and the separator enveloping device 100 shall not be limited to the configuration described in the above exemplary embodiments, but any configuration may be adopted as long as it functions similarly to the above-described embodiments. For example, the laser apparatus 88 may be configured as a scanner-type. In this case, the irradiation position of the laser is three-dimensionally changed by the mirror.

The width of the positive electrode tab 31*b* (the length in a direction along the positive electrode tab side 30*d*) shall not be limited to be smaller than the length of the positive electrode tab side 30*d*, but may be, for example, the same as the length of the positive electrode tab side 30*d*. The same applies to the width of the negative electrode tab 41*b* (the length in the direction along the negative electrode tab side 40*d*).

The positive electrode unit and the negative electrode sheet may be configured in strips, respectively. Subsequently, each one of the electrode units and the negative electrode sheets may be overlaid on top of each other and wound to form a wound-type electrode assembly.

One of the respective configurations of the positive electrode sheets and the negative electrode sheets may be replaced with another. More specifically, a negative electrode unit may be made by covering both sides of the negative electrode sheet with separators while the positive electrode sheet is exposed without being covered by separators. In this case, the configuration at a peripheral edge along active material layers of the positive electrode sheet and the negative electrode sheet may also be replaced.

The invention claimed is:

1. An electric storage device comprising:
an electrode body including first electrode units and second electrode sheets that are alternately laminated wherein the first electrode units include first electrode sheets in which both sides of each of the first electrode sheets are covered by a first and second separator, and wherein the second electrode sheets have different polarities from the first electrode sheets;
wherein each of the first electrode sheets includes a metal foil with a rectangular current collector and a tab part protruding outward from one side of the current collector;
wherein the metal foil is provided with a first face active material layer on a first face of the current collector and a second face active material layer on a second face opposing the first face;
wherein the metal foil is exposed at the tab part;
wherein the first face active material layer includes:
a first face parallel section parallel to and spaced outward from the first face of the current collector,
a first face tapered section provided between a tapered side corresponding to one peripheral edge side of the first face of the current collector and the first face parallel section, and the first face tapered section being inclined toward an inner region of the current collector relative to a thickness direction of the first face active material layer, and
a first face curved section extending continuously to form a curved surface that extends between and across the first face parallel section and the first face tapered section;
wherein the first face tapered section includes at least a portion formed in a planar shape;
wherein a first separator covers the first face side of the current collector and a second separator covers the second face side of the current collector;
wherein the first separator and second separator are joined together at least along the tapered side; and
wherein a part of the first separator opposing to the first face tapered section is arranged along the same direction as the first face tapered section; and
wherein the second face active material layer includes a second face parallel section provided parallel to and spaced outward from the second face of the current collector, a second face orthogonal section extending continuously outward orthogonal to the second face from the second face of the current collector for a predetermined length, and a second face curved section continuously extending to form a curved surface extending between and across the second face parallel section and the second face orthogonal section.

2. The electric storage device of claim 1,
wherein the second face active material layer includes:
wherein the second face orthogonal section extends orthogonal to the second face of the current collector from one peripheral edge side of the current collector corresponding to the tapered side.

3. The electric storage device of claim 2, wherein the first face tapered section and the first face curved section are melted parts that are formed by melting a surface of the first face active material layer.

4. The electric storage device of claim 2, further comprising a first face edge section continuously provided from the tapered side in the vicinity of the metal foil, the first face edge section being formed in a curved face from the tapered side to the first face tapered section, and the first face edge section being inclined toward the inner region of the current collector relative to the thickness direction of the first face active material layer.

5. The electric storage device of claim 2, wherein the second separator is arranged flush against and contacting the second face parallel section wherein said contact region goes toward an outer side of the first electrode sheet.

6. The electric storage device of claim 2, wherein the second separator includes:
a second separator parallel section disposed flush against and contacting the second face parallel section,
a second separator curved section disposed flush against and contacting the second face curved section,
a second separator joint section configured to be joined with the first separator, and
a second separator inclined section provided between the second separator curved section and the second separator joint section so as to be inclined to the first separator side with respect to the second separator parallel section.

7. The electric storage device of claim 2, wherein a plurality of the first electrode units and a plurality of the second electrode sheets are alternately laminated, and each first face of each of the first electrode units is oriented in the same direction.

8. The electric storage device of claim 2, wherein the first face and second face of the rectangular current collector correspond to opposing rectangular faces of the collector perpendicular to the thickness direction of the collector, wherein the collector has the shape of a rectangular prism.

9. The electric storage device of claim 2, where the tab parts protruding outward from the rectangular current collectors, for each of the first electrode units and second electrode sheets, are collectively gathered and connected to a terminal according to polarity.

10. The electric storage device of claim 1,
wherein the first separator includes:
a first separator parallel section disposed flush against and contacting the first face parallel section,
a first separator curved section disposed flush against and contacting the first face curved section,
a first separator joint section where the first separator is joined with the second separator, and
a first separator inclined section provided between the first separator curved section and the first separator joint section, and the first separator inclined section being inclined toward the second separator side relative to the first separator parallel section,
wherein the first separator inclined section includes a first separator first inclined section disposed along the first face tapered section, and a first separator second inclined section extending from the first separator first inclined section so as to be connected to the first separator joint section, and
wherein the first separator second inclined section is arranged to be increasingly linearly spaced apart from the second face orthogonal section as it approaches to the first separator joint section.

11. The electric storage device of claim 1, wherein the predetermined length that the second face orthogonal section extends is shorter than the shortest distance from the second face parallel section to the second face of the current collector.

* * * * *